United States Patent
Imai

(10) Patent No.: US 9,989,643 B2
(45) Date of Patent: Jun. 5, 2018

(54) OBJECT DETECTION DEVICE AND SENSING APPARATUS

(71) Applicant: Shigeaki Imai, Kanagawa (JP)

(72) Inventor: Shigeaki Imai, Kanagawa (JP)

(73) Assignee: RICOH COMPANY, LTD., Tokyo (JP)

( * ) Notice: Subject to any disclaimer, the term of this patent is extended or adjusted under 35 U.S.C. 154(b) by 462 days.

(21) Appl. No.: 14/699,018

(22) Filed: Apr. 29, 2015

(65) Prior Publication Data

US 2015/0316650 A1    Nov. 5, 2015

(30) Foreign Application Priority Data

May 2, 2014    (JP) ................................. 2014-094915

(51) Int. Cl.
| | |
|---|---|
| *G01C 3/08* | (2006.01) |
| *G01S 17/93* | (2006.01) |
| *G01S 17/42* | (2006.01) |
| *G01S 7/481* | (2006.01) |

(52) U.S. Cl.
CPC .......... *G01S 17/936* (2013.01); *G01S 7/4817* (2013.01); *G01S 17/42* (2013.01)

(58) Field of Classification Search
CPC ....... G01S 17/936; G01S 7/4817; G01S 17/42
See application file for complete search history.

(56) References Cited

U.S. PATENT DOCUMENTS

| | | |
|---|---|---|
| 2003/0090647 A1 | 5/2003 | Isogai et al. |
| 2014/0009747 A1 | 1/2014 | Suzuki et al. |
| 2014/0034817 A1 | 2/2014 | Nakamura et al. |
| 2014/0036071 A1 | 2/2014 | Nakamura et al. |
| 2014/0209793 A1 | 7/2014 | Nakamura et al. |
| 2015/0316650 A1 | 11/2015 | Imai |
| 2015/0331108 A1 | 11/2015 | Itami et al. |
| 2016/0061955 A1 | 3/2016 | Imai et al. |

FOREIGN PATENT DOCUMENTS

| | | |
|---|---|---|
| EP | 0 997 746 A1 | 5/2000 |
| EP | 2 696 166 A2 | 2/2014 |
| JP | 08-015412 A | 1/1996 |
| JP | 2009-063339 | 3/2009 |

(Continued)

OTHER PUBLICATIONS

Extended Search Report dated Oct. 5, 2015 in European Patent Application No. 15165759.0.

*Primary Examiner* — Samantha K Abraham
(74) *Attorney, Agent, or Firm* — Oblon, McClelland, Maier & Neustadt, L.L.P.

(57) ABSTRACT

An object detection device includes: a light deflector that scans a scanning area with light emitted from a light source; and a light-receiving unit that, when an object is present in the scanning area, receives reflected light from the object through an imaging forming optical system. The light emitted from the light source irradiates an area having a shape longer in a second direction orthogonal to a first direction than in the first direction. Wpds/Wpdm<Wes/Wem is satisfied, where Wpdm is a length of the light-receiving region in the first direction, Wpds is a length of the light-receiving region in the second direction, Wem is a length of the area irradiated with the light emitted to the object, in the first direction, and Wes is a length of the area irradiated with the light emitted to the object, in the second direction.

12 Claims, 20 Drawing Sheets

(56) References Cited

FOREIGN PATENT DOCUMENTS

| | | |
|---|---|---|
| JP | 2012-107984 | 6/2012 |
| JP | 5082704 | 9/2012 |
| JP | 5251858 | 4/2013 |
| JP | 2014-006110 A | 1/2014 |
| JP | 2014-020889 | 2/2014 |
| JP | 2014-029317 | 2/2014 |
| JP | 2014-032149 | 2/2014 |
| JP | 2014-052366 | 3/2014 |
| JP | 2014-145744 | 8/2014 |
| JP | 2015-212647 | 11/2015 |
| JP | 2015-215282 | 12/2015 |
| JP | 2016-048211 | 4/2016 |

Rld=Wlds/Wldm $Rpd = Wpds/Wpdm$

FIG.22

| | R1 SURFACE | | R2 SURFACE | | R3 SURFACE | | R4 SURFACE | |
|---|---|---|---|---|---|---|---|---|
| | Y-AXIS DIRECTION | Z-AXIS DIRECTION | Y-AXIS DIRECTION | Z-AXIS DIRECTION | Y-AXIS DIRECTION | Z-AXIS DIRECTION | Y-AXIS DIRECTION | Z-AXIS DIRECTION |
| r | 29.79400 mm | ∞ | ∞ | ∞ | ∞ | 15.68100 mm | ∞ | ∞ |
| K | −13.91029 | − | − | − | − | $4.80635 \times 10^{-2}$ | − | − |
| $A_4$ | $4.29239 \times 10^{-5}$ | − | − | − | − | $-2.12076 \times 10^{-5}$ | − | − |
| $A_6$ | $2.76248 \times 10^{-7}$ | − | − | − | − | $-4.29907 \times 10^{-8}$ | − | − |
| $A_8$ | $-8.94758 \times 10^{-9}$ | − | − | − | − | $-1.15355 \times 10^{-10}$ | − | − |
| $A_{10}$ | $6.08112 \times 10^{-11}$ | − | − | − | − | $-2.10866 \times 10^{-12}$ | − | − |

FIG.24

|  | R1 SURFACE | | R2 SURFACE | | R3 SURFACE | | R4 SURFACE | |
| --- | --- | --- | --- | --- | --- | --- | --- | --- |
|  | Y-AXIS DIRECTION | Z-AXIS DIRECTION | Y-AXIS DIRECTION | Z-AXIS DIRECTION | Y-AXIS DIRECTION | Z-AXIS DIRECTION | Y-AXIS DIRECTION | Z-AXIS DIRECTION |
| r | 25.67647 mm | ∞ | ∞ | ∞ | -13.523 mm | ∞ | -15.65814 mm | – |
| K | 0.52705 | – | – | – | – | – | -2.31629 | – |
| $A_4$ | $8.61638 \times 10^{-7}$ | – | – | – | – | – | $-1.22441 \times 10^{-16}$ | – |
| $A_6$ | $3.37659 \times 10^{-10}$ | – | – | – | – | – | $3.98312 \times 10^{-19}$ | – |
| $A_8$ | $-2.21566 \times 10^{-12}$ | – | – | – | – | – | $-1.06687 \times 10^{-21}$ | – |
| $A_{10}$ | $-1.86355 \times 10^{-14}$ | – | – | – | – | – | $1.45000 \times 10^{-24}$ | – |

Rpd2=Wpds2/Wpdm2

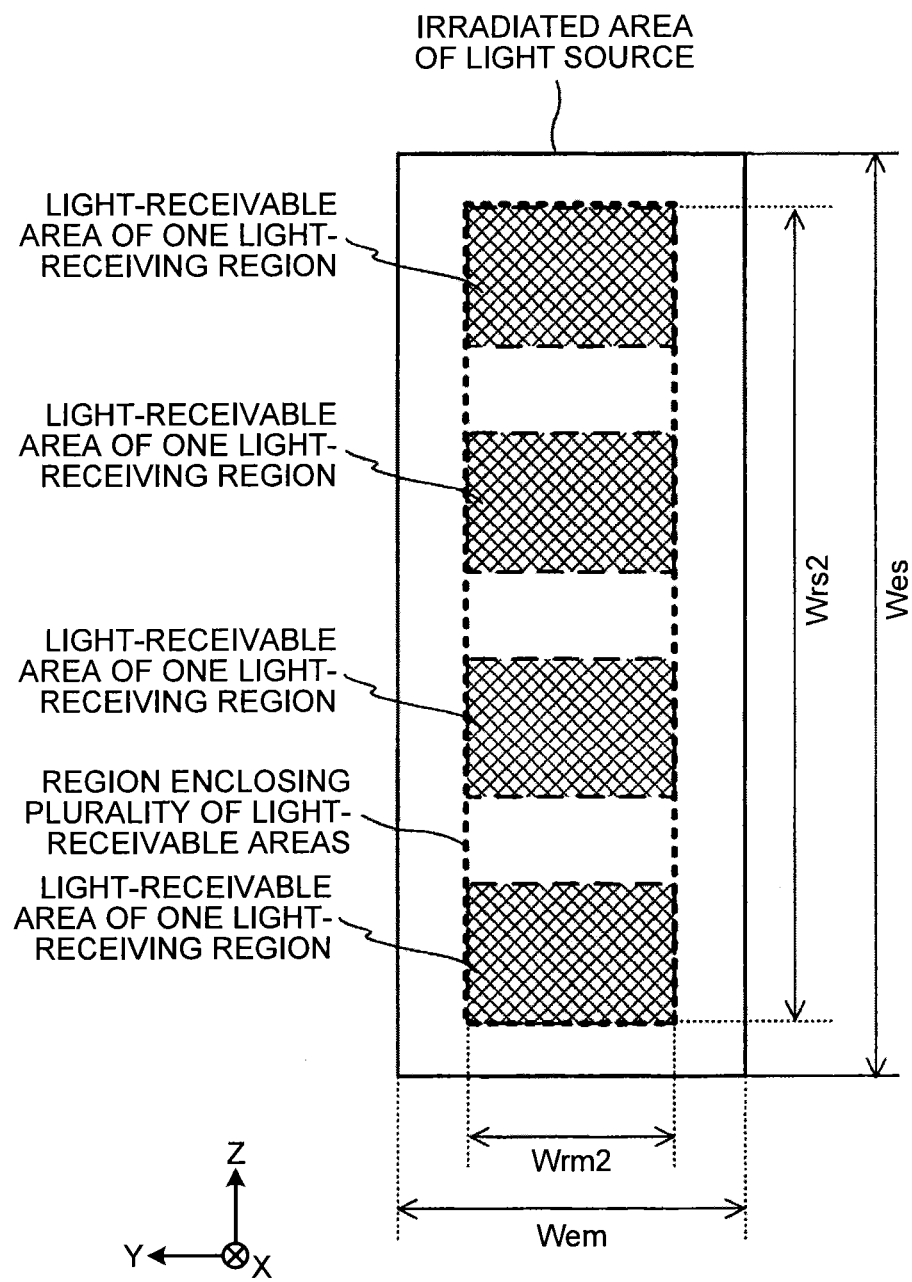

OBJECT DETECTION DEVICE AND SENSING APPARATUS

CROSS-REFERENCE TO RELATED APPLICATIONS

The present application claims priority to and incorporates by reference the entire contents of Japanese Patent Application No. 2014-094915 filed in Japan on May 2, 2014.

BACKGROUND OF THE INVENTION

1. Field of the Invention

The present invention relates generally to an object detection device and a sensing apparatus and, more particularly, to an object detection device for detecting an object and a sensing apparatus including the object detection device.

2. Description of the Related Art

Object detection devices that detect presence/absence of an object and distance to the object have been actively developed in recent years.

For instance, Japanese Patent No. 5251858 discloses a laser radar device including a laser light emitting unit that emits laser light, an optical detection unit that, when laser light is emitted from the laser light emitting unit, detects reflected light which is the laser light reflected off a detection object, a pivoting deflection unit that includes a deflection unit pivotable about a predetermined center axis and that causes the deflection unit to deflect the laser light toward space via a window and deflect the reflected light having passed through the window toward the optical detection unit, a drive unit that drives the pivoting deflection unit, and a distance measurement unit that obtains the distance to the detection object based on detection time, which is time from when the laser light is emitted from the laser emitting unit to when the reflected light reflected off the detection object is detected by the optical detection unit.

Japanese Laid-open Patent Publication No. 2009-063339 discloses a scanning distance measurement apparatus including a first deflecting member that deflects measurement light output from a light emitting unit toward measurement target space, a light receiving lens that condenses reflected light from a measurement target object present in the measurement target space, an optical system that deflects the reflected light having passed through the light receiving lens toward a light receiving unit arranged to face the light emitting unit, and a scanning mechanism that causes the optical system to rotate about a predetermined axial center. The scanning distance measurement apparatus obtains the distance to the measurement target object based on the measurement light and the reflected light detected by the light receiving unit.

Japanese Laid-open Patent Publication No. 2012-107984 discloses a distance measurement apparatus including a light emitting unit that emits a lightwave, a light receiving unit that receives reflected light, which is the lightwave emitted from the light emitting unit and reflected off an object, and delivers an output that depends on intensity of the reflected light, and a distance calculation unit that calculates the distance to the object from which the lightwave is reflected based on the output of the light receiving unit.

Japanese Patent No. 5082704 discloses a laser radar device including a laser light emitting unit that emits laser light, an optical detection unit that, when laser light is emitted from the laser light emitting unit reflected off a detection object, a pivoting deflection unit that includes one deflection unit pivotable about a given center axis and causes the deflection unit to deflect the laser light toward space and deflect the reflected light toward the optical detection unit, a mirror that deflects the laser light emitted from the laser light emitting unit toward the deflection unit, a drive unit that drives the deflection unit of the pivoting deflection unit to rotate, a first rotating unit that rotates the laser light emitting unit about a first rotation axis, a second rotating unit that rotates the laser light emitting unit about a second rotation axis that is orthogonal to the first rotation axis, and a control unit that controls the first rotating unit and the second rotating unit.

However, it is difficult to achieve cost reduction in the apparatuses disclosed in Japanese Patent No. 5251858, Japanese Laid-open Patent Publication No. 2009-063339, Japanese Laid-open Patent Publication No. 2012-107984, and Japanese Patent No. 5082704.

SUMMARY OF THE INVENTION

It is an object of the present invention to at least partially solve the problems in the conventional technology.

An object detection device includes: a light source; a light deflector that scans a scanning area with light emitted from the light source; an imaging forming optical system; and a light-receiving unit that, when an object is present in the scanning area, receives reflected light from the object through the imaging forming optical system. The light emitted from the light source is emitted to the object so as to irradiate an area having a shape longer in a second direction orthogonal to a first direction than in the first direction. Wpds/Wpdm<Wes/Wem is satisfied, where Wpdm is a length of the light-receiving region in the first direction, Wpds is a length of the light-receiving region in the second direction, Wem is a length of the area irradiated with the light emitted to the object, in the first direction, and Wes is a length of the area irradiated with the light emitted to the object, in the second direction.

The above and other objects, features, advantages and technical and industrial significance of this invention will be better understood by reading the following detailed description of presently preferred embodiments of the invention, when considered in connection with the accompanying drawings.

BRIEF DESCRIPTION OF THE DRAWINGS

FIG. 22 is a diagram for describing numerical examples of the imaging forming optical system 28 of the first specific example;

FIG. 24 is a diagram for describing a numerical example of the imaging forming optical system 28 of the second specific example;

FIG. 28 is a second diagram for describing the case where the photodetector 29 includes the plurality of light-receiving regions.

DETAILED DESCRIPTION OF THE PREFERRED EMBODIMENTS

A laser radar is known as a vehicle onboard device for detecting presence/absence of an object forward of the vehicle that is traveling and the distance to the object. Among various laser radars, laser radar devices that scan laser light emitted from a light source using a rotary mirror and detect, by using the rotary mirror again, object-reflected light using a photodetector are disclosed in Japanese Patent No. 5251858, Japanese Laid-open Patent Publication No. 2009-063339, Japanese Laid-open Patent Publication No. 2012-107984, and Japanese Patent No. 5082704.

Such a scanning-type laser radar can use laser light with a reduced radius as detection light and therefore is advantageous in terms of detection accuracy and detectable distance.

It is preferable that the light that irradiates an object is small in a scanning direction in order to increase the object detection resolution of a scanning-type laser radar. It is preferable that the light that irradiates the object is large in a direction (hereinafter, sometimes referred to as "orthogonal-to-scan direction" for convenience) orthogonal to the scanning direction in order to detect the object reliably even if a vehicle or the like vibrates. In short, it is preferable that light that irradiates an object has a shape (profile) elongated in the orthogonal-to-scan direction.

Generally, a photodetector has a shape similar to the shape of a region irradiated with light on the object. However, a photodetector having an elongated shape has a disadvantage that it is prone to non-uniform distribution of applied voltage, and a failure is likely to occur at a position on the photodetector where a voltage concentrates.

This disadvantage is more pronounced when an APD (avalanche photodiode) is used as the photodetector as in the distance measurement apparatus disclosed in Japanese Laid-open Patent Publication No. 2012-107984. Furthermore, use of a photodetector having an elongated shape decreases manufacturing yield to thus disadvantageously increase cost.

The smaller a light-receiving region of a photodetector, the more advantageous in cost. However, reducing a light-receiving region of a photodetector having an elongated shape has a disadvantage that the length of shorter side of the photodetector is reduced too much, making the manufacture difficult and, accordingly, making it difficult to reduce cost.

Further, in the case where a plurality of layers in the orthogonal-to-scan direction are detected as in the distance measurement apparatus disclosed in Japanese Laid-open Patent Publication No. 2012-107984, it is required to arrange a plurality of photodetectors along the orthogonal-to-scan direction, which can cause, in addition to the disadvantage described above, a false detection resulting from variation in sensitivity among the plurality of photodetectors.

Figure 1:
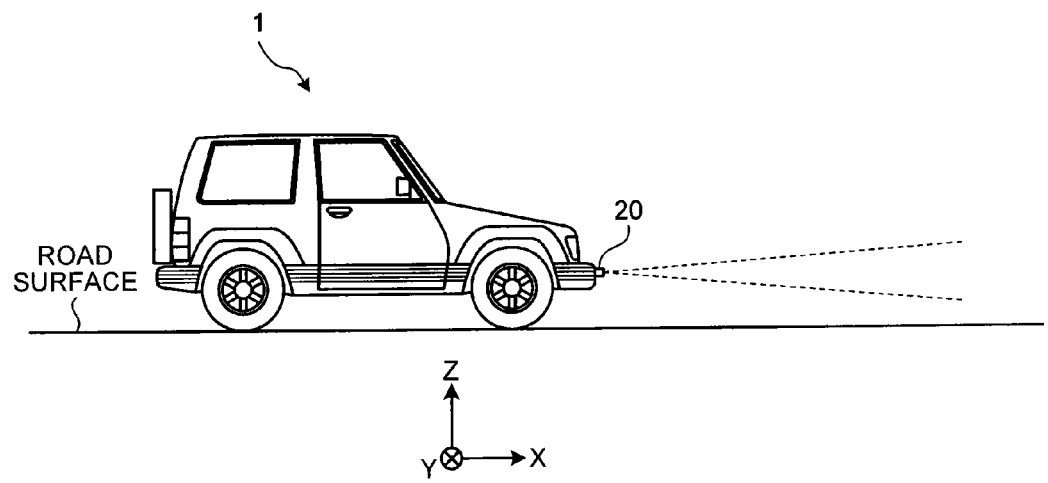
FIG. 1 is an exterior view of a vehicle including an onboard laser radar 20 according to an embodiment of the present invention.

One embodiment of the present invention is described below with reference to FIGS. 1 to 28. FIG. 1 is an exterior view of a vehicle 1 including an onboard laser radar 20 which is an example of "object detection device" according to the embodiment.

The laser radar 20 is mounted, as an example, on the vehicle 1 at a position near a license plate at the front of the vehicle 1. Hereinafter, it is assumed that, in an XYZ three-dimensional Cartesian coordinate system, a direction orthogonal to road surface is the Z-axis direction, the direction in which the vehicle 1 moves forward is the positive X-direction.

Figure 2:
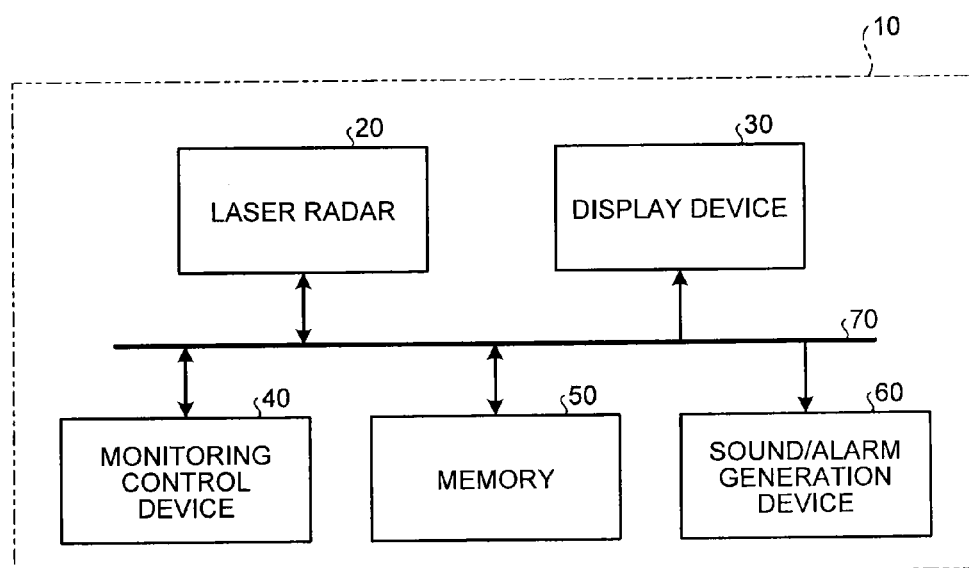
FIG. 2 is a block diagram for describing a configuration of a monitoring apparatus 10 according to the embodiment.

As illustrated in FIG. 2 as an example, the vehicle 1 internally includes a display device 30, a monitoring control device 40, a memory 50, and a sound/alarm generation device 60. These devices are electrically connected to each other via a bus 70 via which data can be transmitted.

Here, the laser radar 20, the display device 30, the monitoring control device 40, the memory 50, and the sound/alarm generation device 60 make up a monitoring apparatus 10 which serves as a sensing apparatus. Hence, the monitoring apparatus 10 is mounted on the vehicle 1. The monitoring apparatus 10 is electrically connected to a main controller of the vehicle 1.

Figure 3:
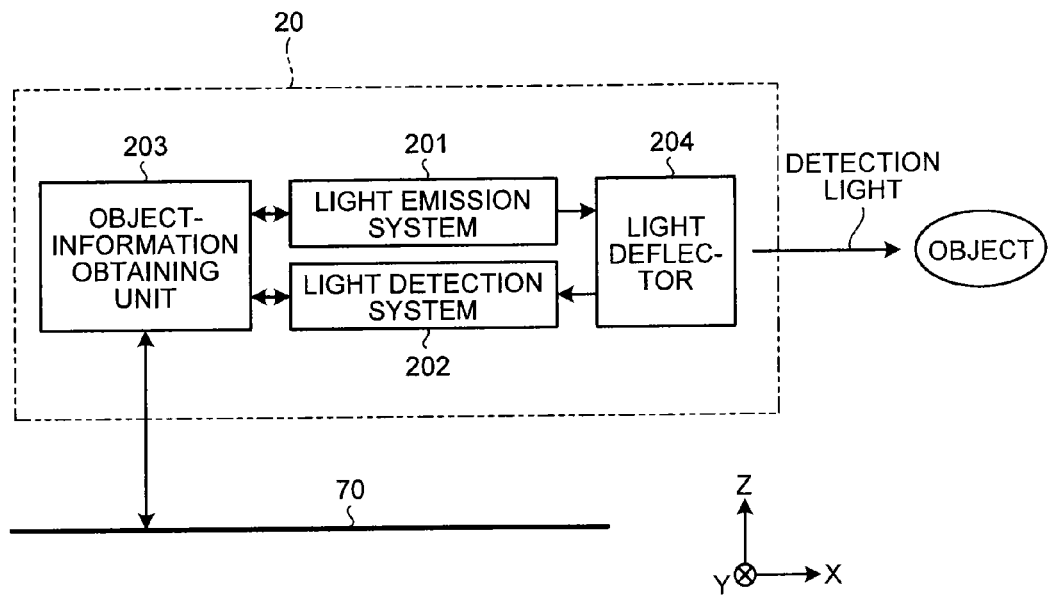
FIG. 3 is a diagram for describing a configuration of the laser radar 20.
Figure 6:
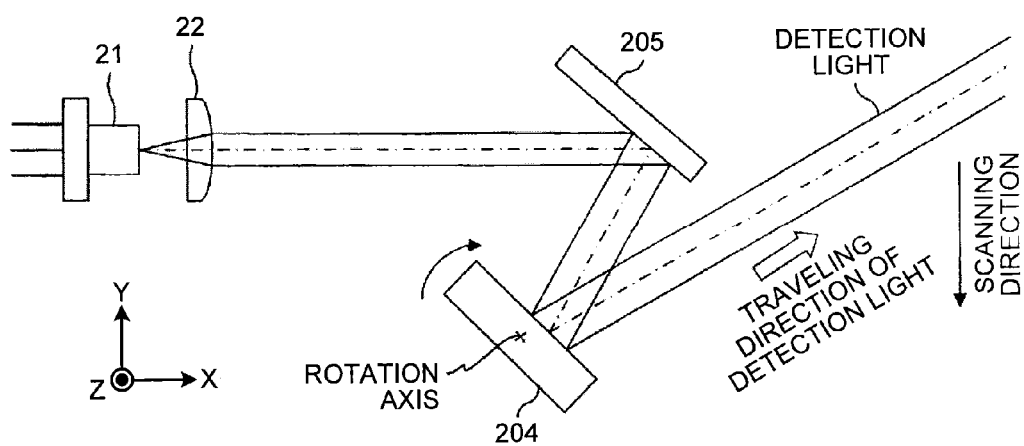
FIG. 6 is a first diagram for describing a traveling direction of detection light.
Figure 10:
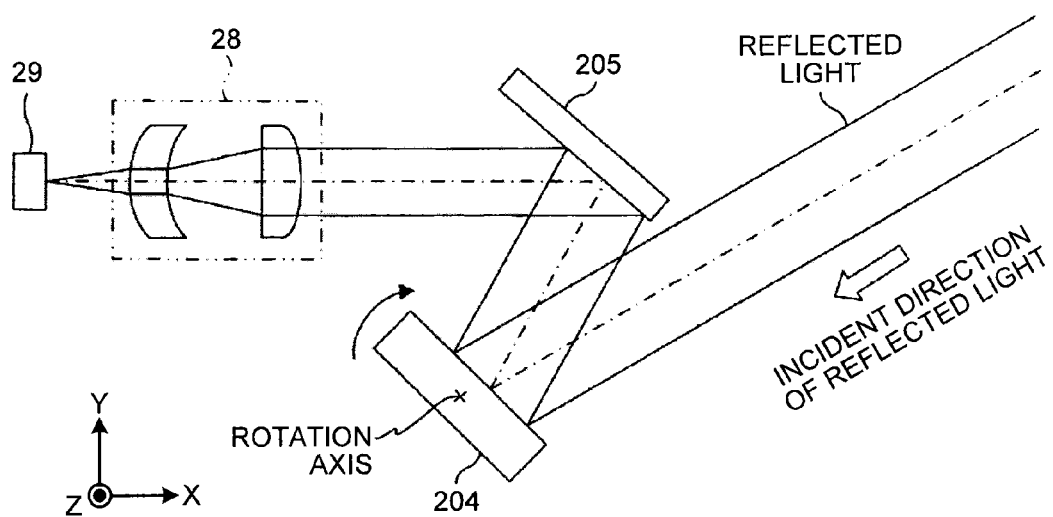
FIG. 10 is a first diagram for describing an incident direction of object-reflected light.

The laser radar 20 includes, as illustrated in FIG. 3 as an example, a light emission system 201, a light deflector 204, a light detection system 202, an object-information obtaining unit 203, and a reflecting mirror 205 (which is not shown in FIG. 3; see FIGS. 6 and 10). These elements are housed in a casing (not shown). In the embodiment, the light emission system 201 is located in the positive Z direction from the light detection system 202.

The light emission system 201 emits light in the positive X direction. The reflecting mirror 205 is located in the positive X direction from the light emission system 201 to reflect the light emitted from the light emission system 201 toward the light deflector 204 (see FIGS. 6 to 8). The light deflector 204 deflects the light emitted from the light emission system 201 and reflected off the reflecting mirror 205 toward a detection region.

Figure 11:
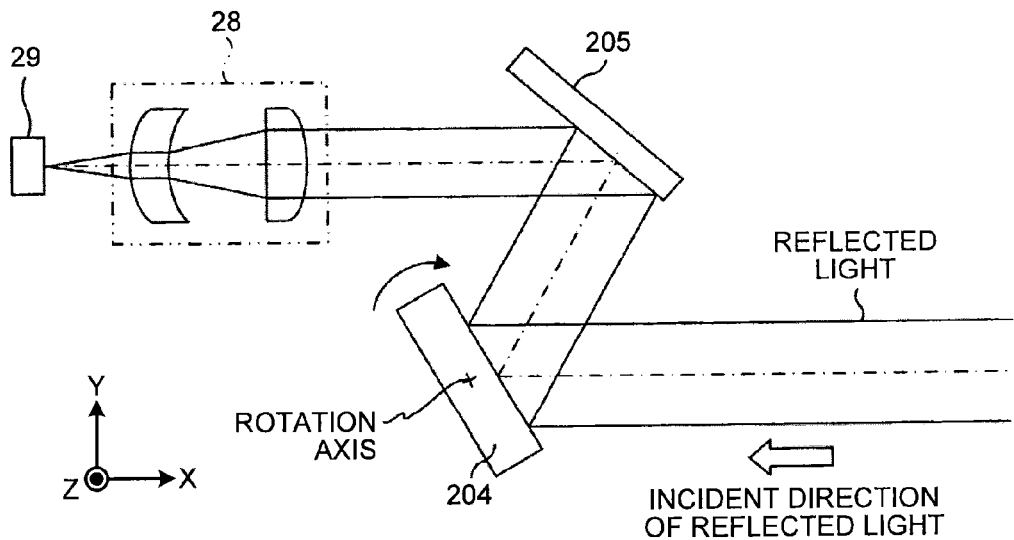
FIG. 11 is a second diagram for describing an incident direction of object-reflected light.
Figure 12:
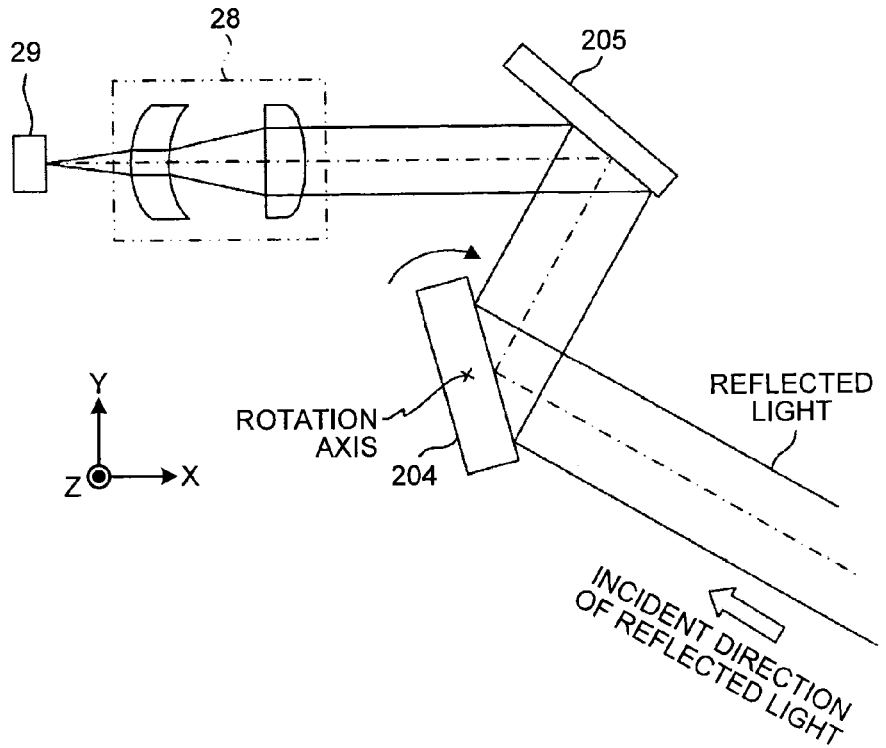
FIG. 12 is a third diagram for describing an incident direction of object-reflected light.

The light deflector 204 also deflects object-reflected light in the direction toward the reflecting mirror 205 (see FIGS. 10 to 12). The light detection system 202 detects the light reflected off the reflecting mirror 205. The object-information obtaining unit 203 controls the light emission system 201 and the light deflector 204 and obtains object information about presence/absence of an object, the distance to the object, the size of the object, the shape of the object, and the position of the object and/or the like based on a detection result output from the light detection system 202.

The reflecting mirror 205 is provided to reduce the size of the laser radar 20 by bending optical path.

Figure 4:
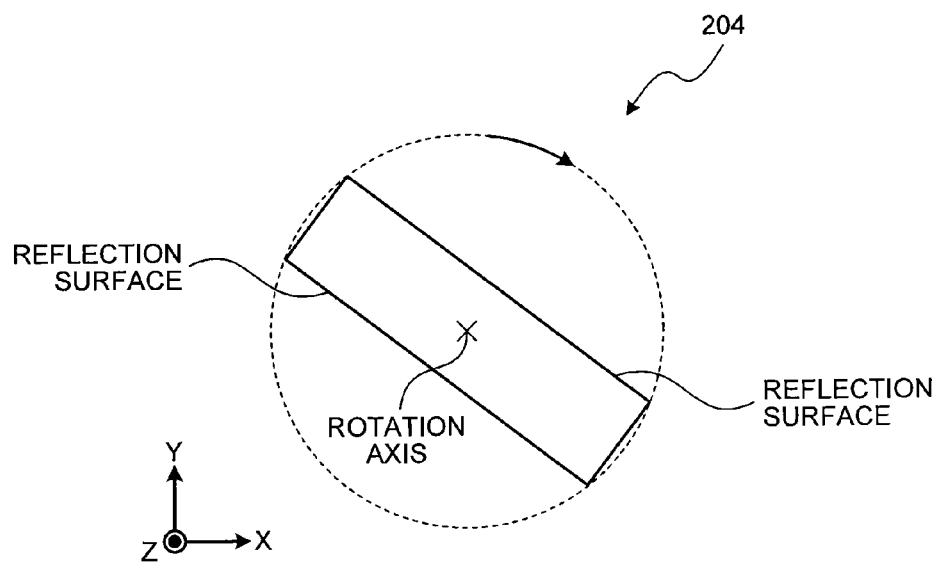
FIG. 4 is a diagram for describing a light deflector 204.

The light deflector 204 includes a rotary mirror that rotates about a rotation axis parallel to the Z axis and has two reflection surfaces as illustrated in FIG. 4 as an example. Here, each of the reflection surfaces is parallel to the Z axis. The object-information obtaining unit 203 controls rotation of the rotary mirror. The number of the reflection surfaces is not limited to two; the number may be one, or three or more. A configuration in which at least two reflection surfaces are tilted relative to the rotation axis at different tilt angles so that scanning areas are alternated in the Z-axis direction can be employed.

Figure 5:
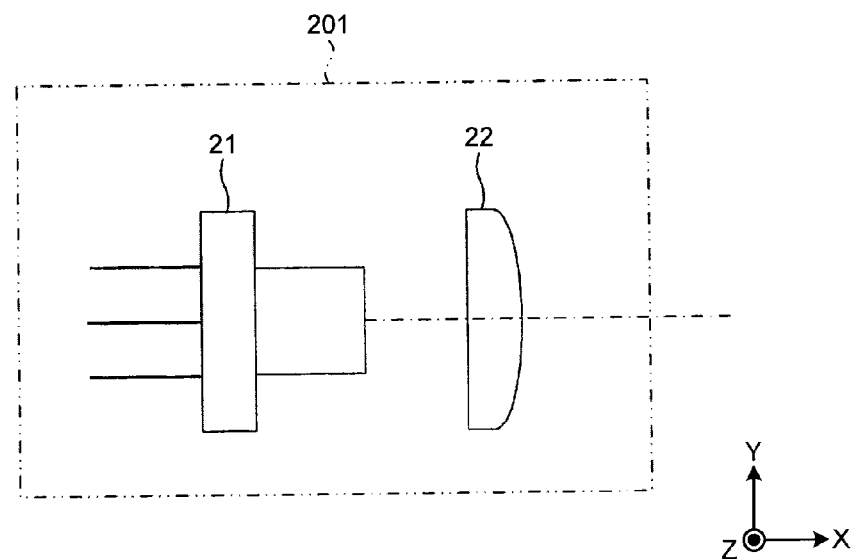
FIG. 5 is a diagram for describing a light emission system 201.

The light emission system 201 includes a light source 21 and a coupling lens 22 as illustrated in FIG. 5 as an example.

The light source 21 is switched on and off by the object-information obtaining unit 203. The object-information obtaining unit 203 causes the light source 21 to emit pulsed light at the time of object detection. Here, the light source 21 is arranged so as to emit light in the positive X direction. The coupling lens 22 is located in the positive X direction from the light source 21.

The light emitted from the light source 21 is coupled by the coupling lens 22, is reflected by the reflecting mirror 205 and is incident on the reflection surface of the light deflector 204. The light reflected off the reflection surface of the light deflector 204 serves as detection light emitted from the laser radar 20.

Figure 7:
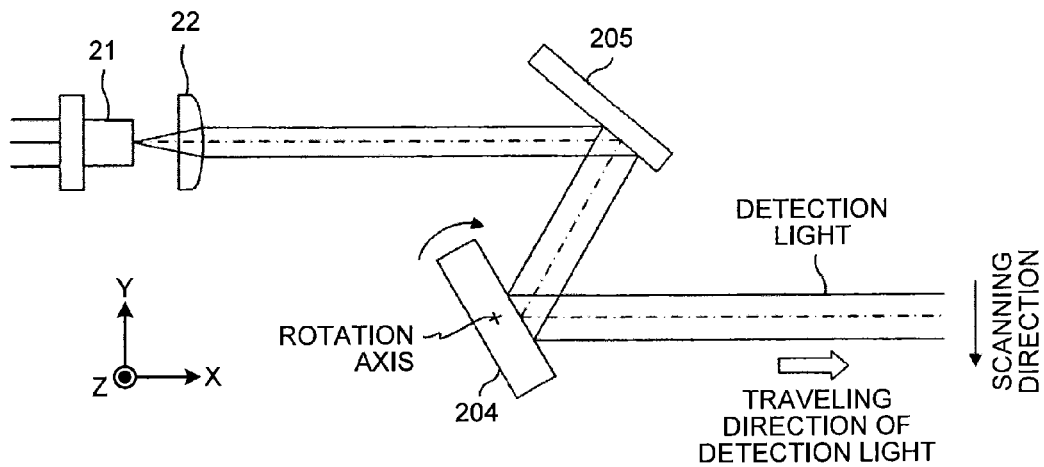
FIG. 7 is a second diagram for describing a traveling direction of detection light.
Figure 8:
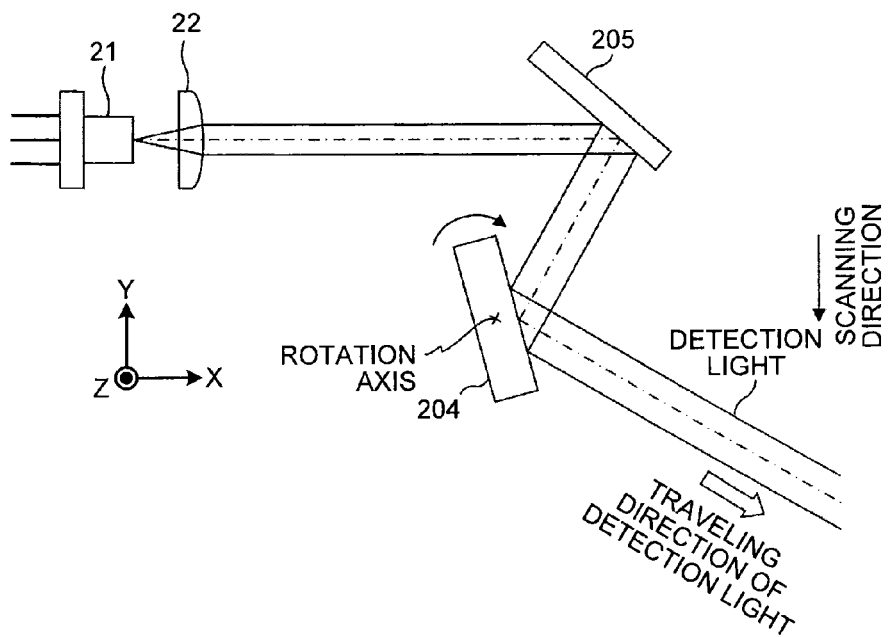
FIG. 8 is a third diagram for describing a traveling direction of detection light.

As the reflecting mirror of the light deflector 204 rotates, traveling direction of the detection light shifts in the plane orthogonal to the Z-axis direction (see FIGS. 6 to 8). More specifically, the detection light is scanned along the Y-axis direction as the reflecting mirror of the light deflector 204 rotates. Here, the detection light is scanned in the negative Y-direction. A region scanned by the detection light is the detection region.

The light deflector 204 includes a sensor (e.g., a Hall element) for detecting a rotation angle of the reflecting mirror, and an output signal of the sensor is transmitted to the object-information obtaining unit 203. Accordingly, the object-information obtaining unit 203 can know the rotation angle of the reflecting mirror based on the output signal of the sensor.

When an object is present in the detection region, a part of light emitted from the laser radar 20 and reflected off the object returns to the laser radar 20. Hereinafter, light that returns to the laser radar 20 by being reflected off an object may be referred to as "object-reflected light" for convenience.

Object-reflected light that is deflected by the light deflector 204 toward the reflecting mirror 205 is reflected off the reflecting mirror 205 to be incident on the light detection system 202.

Figure 9:
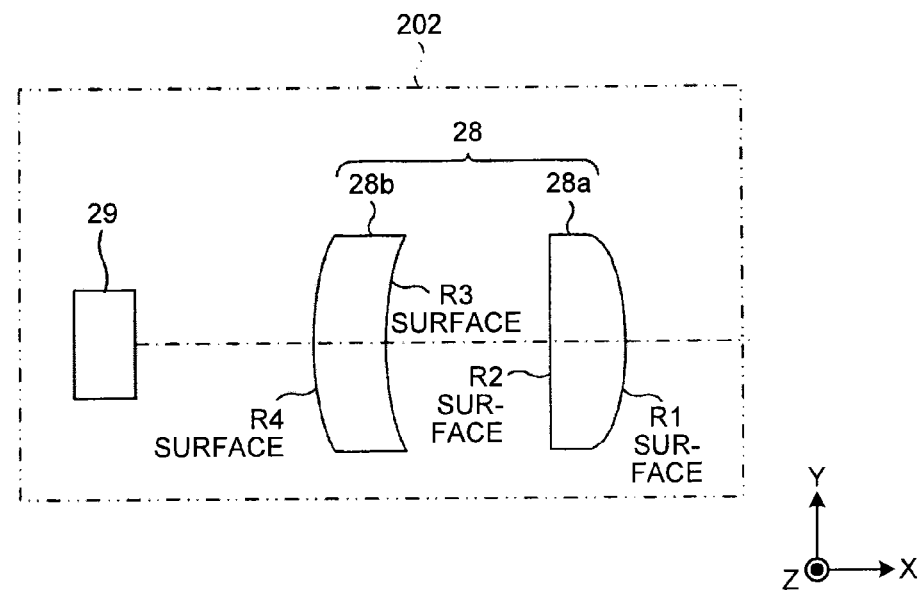
FIG. 9 is a diagram for describing a light detection system 202.

The light detection system 202 includes an imaging forming optical system 28 and a photodetector 29 as illustrated in FIG. 9 as an example.

The imaging forming optical system 28 is arranged on an optical path of the light reflected off the reflecting mirror 205 to converge the light. Here, the imaging forming optical system 28 includes a first imaging forming element 28a and a second imaging forming element 28b. The first imaging forming element 28a is an imaging forming element on the positive X side and the second imaging forming element 28b is an imaging forming element on the negative X side.

The incident surface, which is on the positive X side, of the first imaging forming element 28a is referred to as "R1 surface", and the exit surface, which is on the negative X side, of the same is referred to as "R2 surface". The incident surface, which is on the positive X side, of the second imaging forming element 28b is referred to as "R3 surface", and the exit surface, which is on the negative X side, of the same is referred to as "R4 surface".

The photodetector 29 receives light having passed through the imaging forming optical system 28 and outputs a signal that depends on intensity of the received light to the object-information obtaining unit 203.

A PD (photodiode), an APD (avalanche photodiode), a SPAD (single-photon avalanche diode) which is a Geiger-mode APD, or the like can be used as a light-receiving element of the photodetector 29. Because of higher sensitivity than a PD, an APD or a SPAD is advantageous in terms of detection accuracy and detectable distance.

The object-information obtaining unit 203 determines that the photodetector 29 has received object-reflected light when the output level of the photodetector 29 is equal to or higher than a preset threshold. When the photodetector 29 has received object-reflected light, the object-information obtaining unit 203 calculates the distance to the object based on information about when the light source 21 is switched on and when the photodetector 29 has received light. Furthermore, the object-information obtaining unit 203 obtains the object information about the position of the object, the size of the object, and the shape of the object and/or the like, and stores the object information in the memory 50.

The object-information obtaining unit 203 can know the incident direction of the object-reflected light from the rotation angle of the rotary mirror of the light deflector 204 as illustrated in FIGS. 10 to 12 as an example.

If the output level of the photodetector 29 remains lower than the preset threshold even after a predetermined period of time has elapsed since when the light source 21 is switched on, the object-information obtaining unit 203 determines that no object is detected and stores this result of determination in the memory 50.

Referring back to FIG. 2, the monitoring control device 40 determines, when an object is present ahead of the vehicle 1, whether or not the object is moving based on the object information stored in the memory 50 and/or the like at each of predetermined timings. If the object is moving, the monitoring control device 40 further determines motion information including the moving direction and the moving velocity. The monitoring control device 40 causes the object information and the motion information to be displayed on the display device 30.

The monitoring control device 40 determines whether danger is present based on the object information and the motion information. Upon determining that danger is present, the monitoring control device 40 informs the main controller and the sound/alarm generation device 60 of the vehicle 1 thereof.

Figure 13:
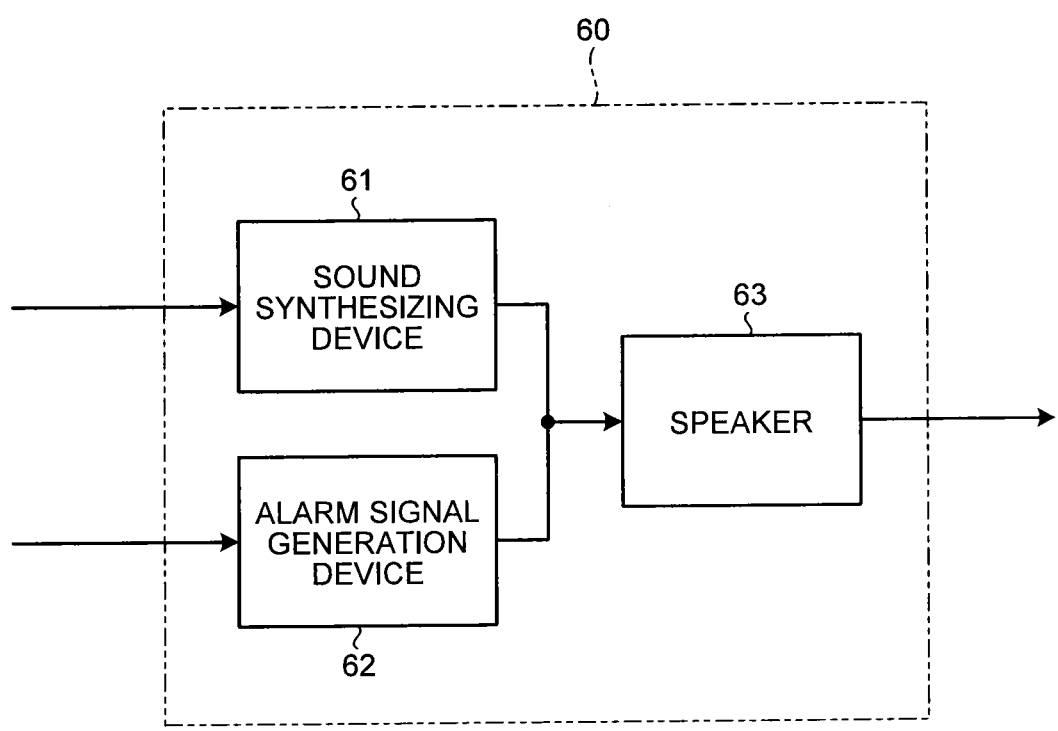
FIG. 13 is a block diagram for describing a configuration of a sound/alarm generation device 60.

The sound/alarm generation device 60 includes a sound synthesizing device 61, an alarm signal generation device 62, and a speaker 63 as illustrated in FIG. 13 as an example.

The sound synthesizing device 61 includes a plurality of sound data. Upon receiving the information indicating that danger is present from the monitoring control device 40, the sound synthesizing device 61 selects corresponding sound data and outputs the sound data to the speaker 63.

Upon receiving the information indicating that danger is present from the monitoring control device 40, the alarm signal generation device 62 generates a corresponding alarm signal and outputs the alarm signal to the speaker 63.

In the embodiment, the light emission system 201 and the light detection system 202 are arranged to overlap with each other with respect to the Z direction, and the light deflector 204 and the reflecting mirror 205 are shared between the light emission system 201 and the light detection system 202. This reduces relative displacement between an area on the object irradiated with light emitted from the light source 21 and a light-receivable area of the photodetector 29, and thereby reliable object detection can be realized.

The area on the object irradiated with light emitted from the light source 21, the light-receivable area of the photodetector 29, a light-emitting region of the light source 21, and the light-receiving region of the photodetector 29 are described here.

Hereinafter, for brevity, the area on the object irradiated with light emitted from the light source 21 may be simply referred to as the "irradiated area". The light-receivable area of the photodetector 29 may be simply referred to as the "light-receivable area". The light-emitting region of the light source 21 may be simply referred to as the "light-emitting region". The light-receiving region of the photodetector 29 may be simply referred to as the "light-receiving region".

Figure 14:
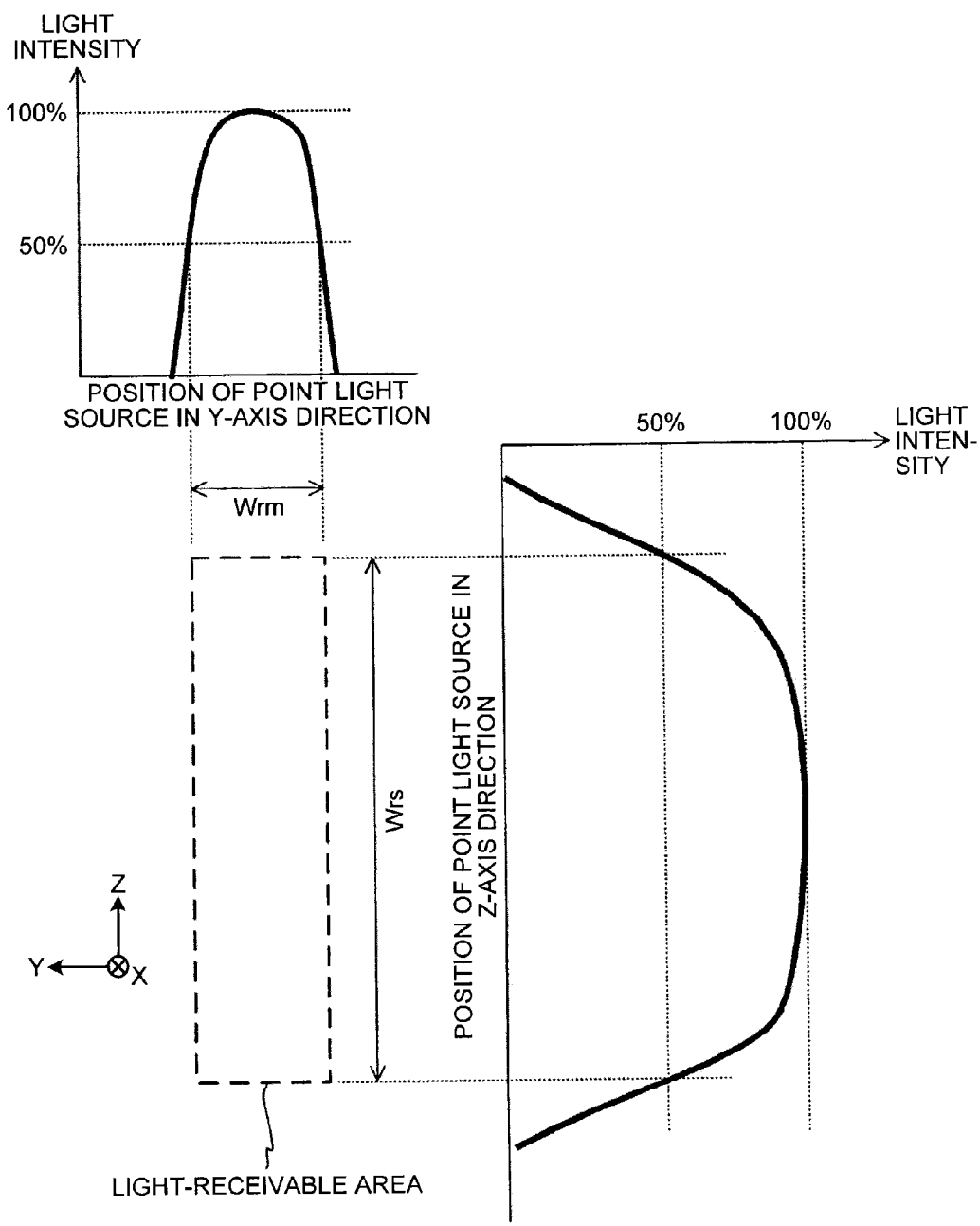
FIG. 14 is a diagram for describing a light-receivable region of a photodetector 29.

Here, the irradiated area is defined as an area where the light intensity is equal to or higher than a half-peak value. The light-receivable area is defined as an area where the intensity of light emitted from a point light source, which is arranged at a position in the detection region and moved in the Y-axis direction and in the Z-axis direction, and received by the photodetector 29 is equal to or higher than 50% of the peak value as illustrated in FIG. 14 as an example.

Figure 15:
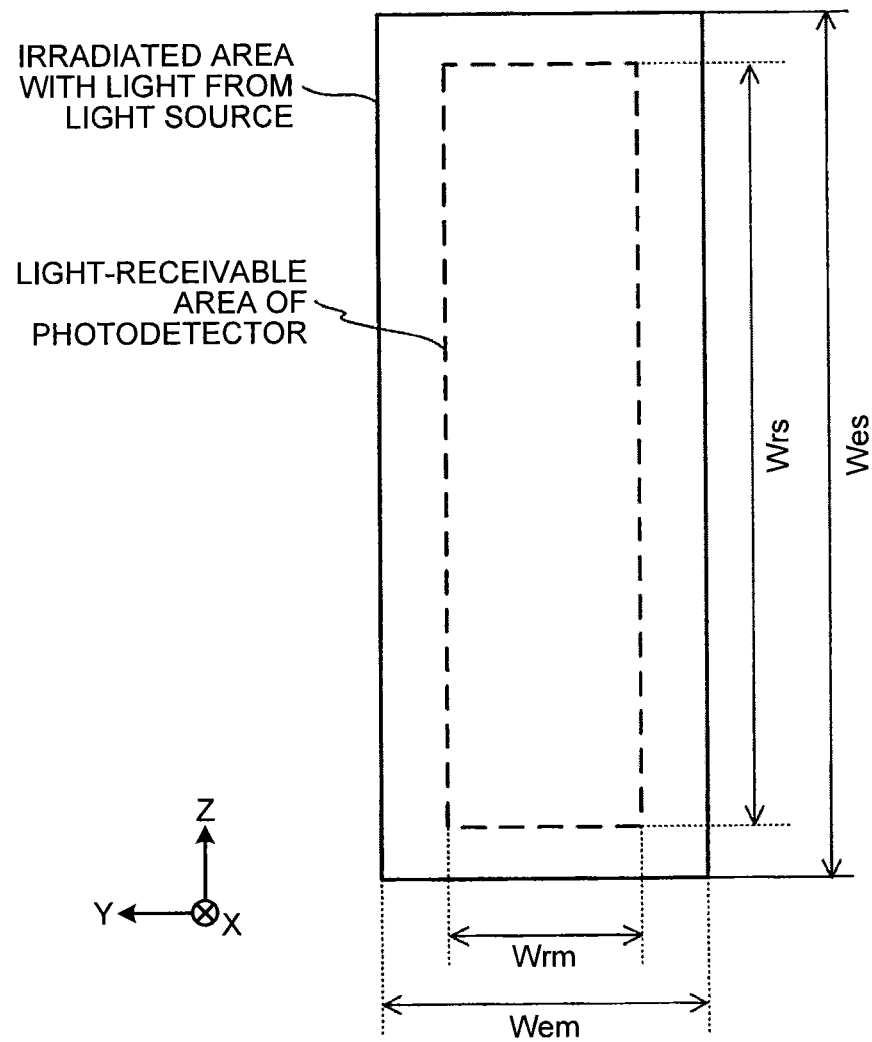
FIG. 15 is a diagram for describing relationship between an area irradiated with light emitted from the light source 21 and the light-receivable region of the photodetector 29.

FIG. 15 illustrates relationship between the irradiated area and the light-receivable area. It is desirable to set the size of the irradiated area to be equal to or slightly larger than the size of the light-receivable area. Configured as such, the light-receivable area can be irradiated with light efficiently. As a result, the intensity of light in the light-receivable area can be increased, which is preferable in terms of detection accuracy and detectable distance.

Setting the size of the irradiated area slightly larger than the size of the light-receivable area can prevent, or at least reduce, reduction in detection accuracy and detectable distance even when the irradiated area deviates from the light-receivable area due to manufacturing error. Furthermore, because the entire light-receivable area is irradiated with light, detection omission errors can be prevented.

Here, the length of the irradiated area in the Y-axis direction is denoted by Wem, the length of the irradiated area in the Z-axis direction is denoted by Wes, and the denotation Re=Wes/Wem is used. Further, the length of the light-receivable area in the Y-axis direction is denoted by Wrm, the length of the light-receivable area in the Z-axis direction is denoted by Wrs, and the denotation Rr=Wrs/Wrm is used.

The size of the irradiated area and the size of the light-receivable area vary depending on the position in the X-axis direction. Accordingly, for convenience, each of Wem and Wes is expressed as an angle of divergence of light exiting from the laser radar 20, and each of Wrm and Wrs is expressed as an angle of divergence of light incident on the laser radar 20.

For example, if Wem=0.2 (degrees), Wes=1.2 (degrees), Wrm=0.1 (degrees), and Wrs=1 (degree), the irradiated area is slightly larger than the light-receivable area in size.

The smaller the size of the light-receivable area in the scanning direction (in this example, the Y-axis direction), the higher the object detection resolution. The larger the size of the light-receivable area in the orthogonal-to-scan direction (in this example, the Z-axis direction), the more reliably an object can be detected even if the entire laser radar 20 vibrates.

In short, it is desirable that the light-receivable area has a shape elongated in the Z-axis direction. Accordingly, it is preferable that the irradiated area also has a shape elongated in the Z-axis direction.

Figure 16:
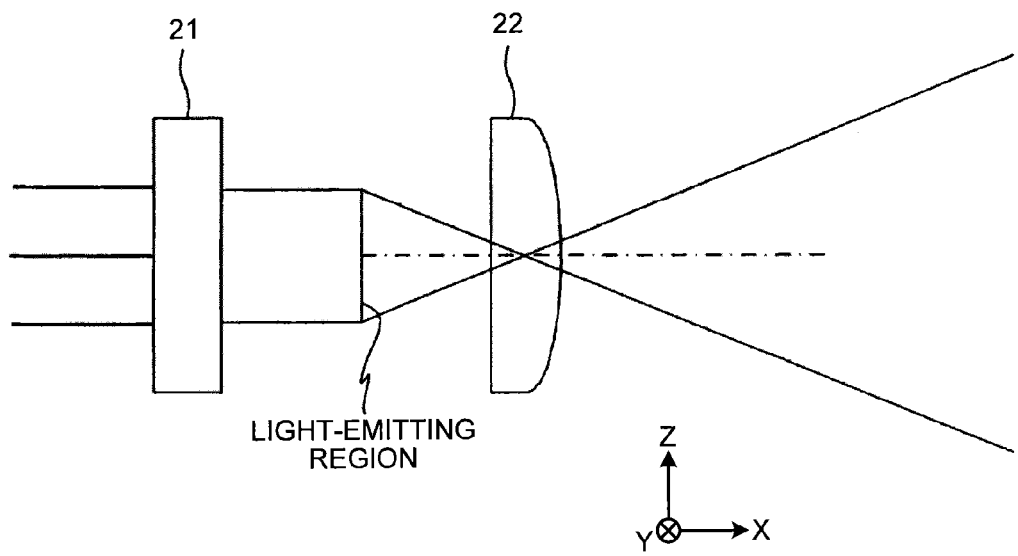
FIG. 16 is a first diagram for describing a light-emitting region of the light source 21.
Figure 17:
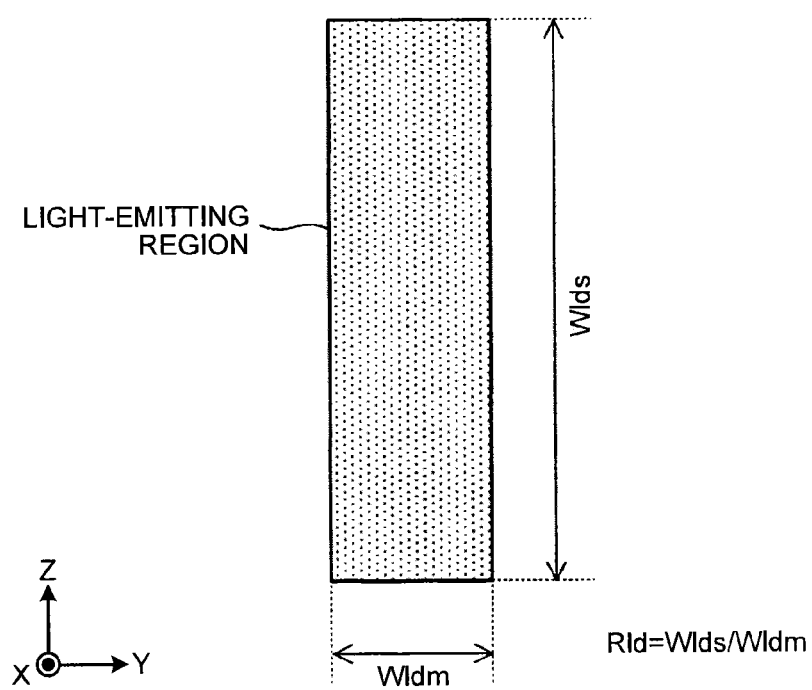
FIG. 17 is a second diagram for describing the light-emitting region of the light source 21.

To obtain such an irradiated area, the light-emitting region has a shape elongated in the Z-axis direction (see FIGS. 16 and 17). Here, the length of the light-emitting region in the Y-axis direction is denoted by Wldm, the length of the light-emitting region in the Z-axis direction is denoted by Wlds, and the denotation Rld=Wlds/Wldm is used. The value of Rld can be set to the same value as Re; however, setting Rld to the same value increases the restriction of the light source 21, which can disadvantageously result in decrease in intensity of emitted light or increase in cost.

Hence, it is desirable to set the focal length of the coupling lens 22 and the position of the coupling lens 22 in relation to the light source 21 such that light emitted from one point of the light source 21 is caused to diverge when passing through the coupling lens 22, thereby making the value of Rld larger than the value of Re. With this, a desired irradiated area can be obtained while reducing decrease in intensity of light emitted from the light source 21 or increase in cost.

The size of the light-emitting region that achieves Wem=0.2 (degrees) and Wes=1.2 (degrees) is discussed below.

If the focal length of the coupling lens 22 is set to 6 mm and the position of the coupling lens 22 in relation to the light source 21 is set such that light emitted from one point of the light source 21 exits the coupling lens 22 as parallel light, Wldm=0.021 (mm) and Wlds=0.126 (mm) are satisfied. It is difficult to manufacture the light source 21 having such a light-emitting region because the value of Wldm is too large. If the manufacture is easy when the value of Wldm is 0.001 mm, the coupling lens 22 has the focal length of 0.3 mm, which is difficult to realize. Furthermore, under this condition, intensity of emitted light is small because the value of Wlds is 0.006 mm.

Hereupon, Wem=0.2 (degrees) and Wes=1.2 (degrees) can be attained by setting the focal length of the coupling lens 22 to 6 mm, Wldm to 0.001 mm and Wlds to 0.126 mm and performing setting such that light emitted from one point of the light source 21 becomes divergent light when exiting from the coupling lens 22.

More strictly, the value of Wes is slightly larger than 1.2 (degrees) because the light emitted from the one point of the light source 21 becomes divergent light when exiting from the coupling lens 22. However, Wes=1.2 (degrees) can be attained by finely adjusting the focal length of the coupling lens 22.

By performing setting such that light emitted from one point of the light source 21 becomes divergent light when exiting from the coupling lens 22, the light source 21 that is easy to manufacture and reduction in intensity of emitted light is suppressed can be provided.

Figure 18A:
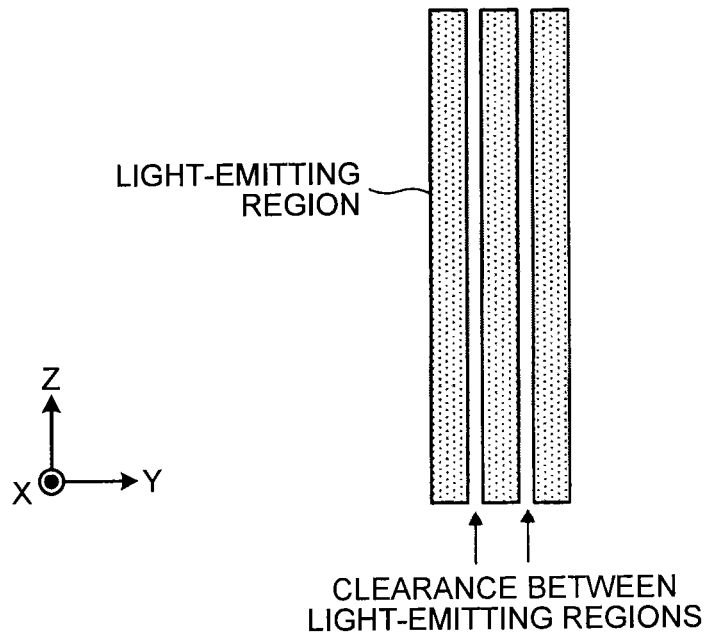
FIGS. 18A and 18B are diagrams for describing a plurality of light-emitting regions.
Figure 18B:
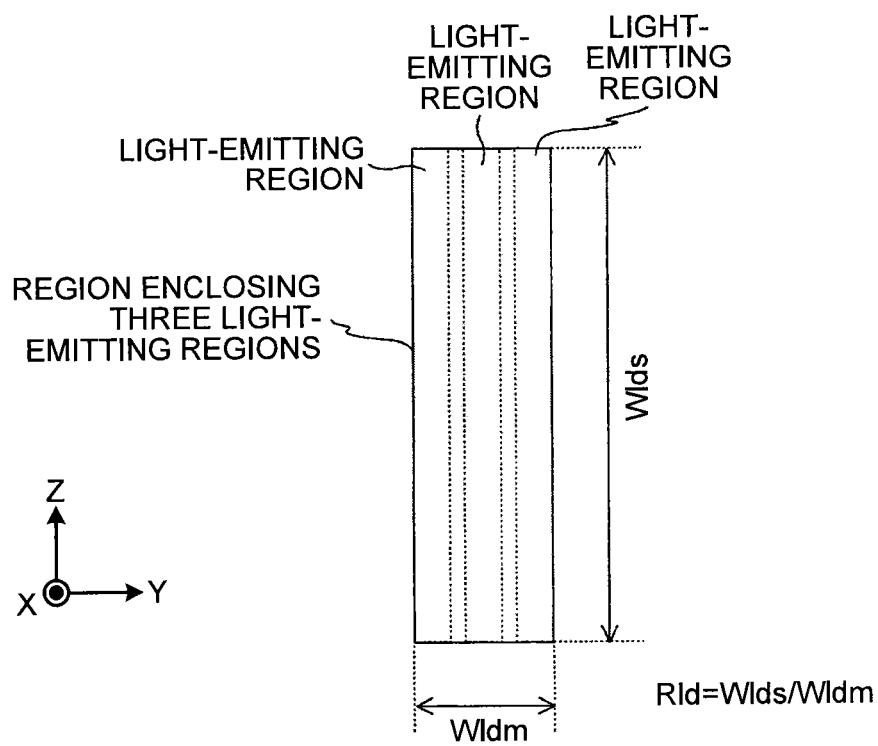
Figure 19:
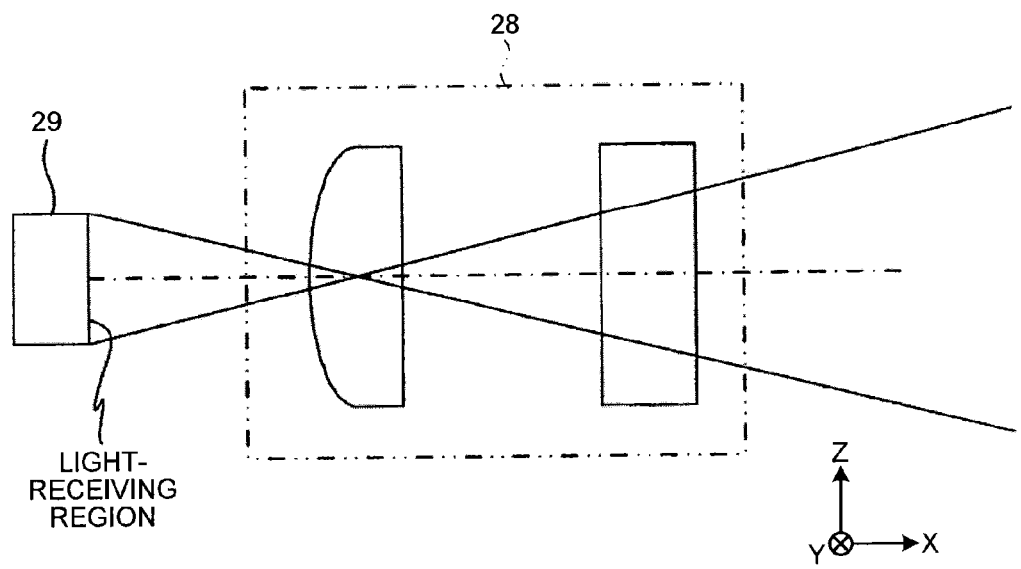
FIG. 19 is a first diagram for describing a light-receiving region of the photodetector 29.
Figure 20:
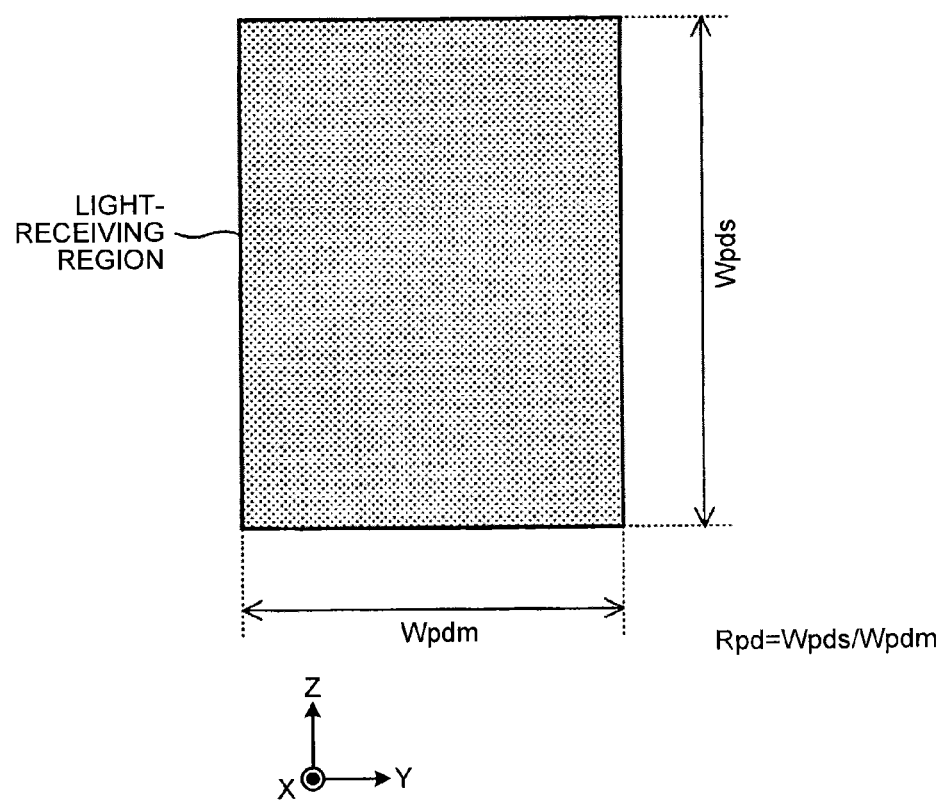
FIG. 20 is a second diagram for describing the light-receiving region of the photodetector 29.

The light source 21 may include a single light-emitting region as illustrated in FIG. 17 or, alternatively, may include a plurality of light-emitting regions. FIG. 18A illustrates an example where the light source 21 includes three light-emitting regions. In this example, as illustrated in FIG. 18B, the length of a region enclosing the three light-emitting regions in the Z-axis direction is denoted by Wlds, and that in the Y-axis direction is denoted by Wldm.

When the light source 21 includes a plurality of light-emitting regions and setting is performed such that light emitted from one point of the light source 21 becomes divergent light when exiting from the coupling lens 22, the light is diffused in the detection region by the effect of the divergence. As a result, the situation as if a light-emitting region is provided also in each clearance between the light-emitting regions is established, and detection omission error can be reduced.

Meanwhile, to realize the light-receivable area described above, it is conceivable to perform setting such that the light-receiving region (see FIG. 19) has a shape similar to that of the light-receivable area, and object-reflected light is imaged on the light-receiving region with a rotational-symmetric imaging forming optical system having an appropriate focal length. The focal length of the rotational-symmetric imaging forming optical system is denoted by fr.

However, with this, the light-receiving region has an elongated shape. As described earlier, the light-receiving region having an elongated shape poses various disadvantages. To avoid these disadvantages, it is desirable to make the shape of the light-receiving region close to a square.

Hereupon, setting is performed such that the value of Rpd is smaller than the value of Re, where Wpdm is the length in the Y-axis direction of the light-receiving region, Wpds is the length in the Z-axis direction, and Rpd=Wpds/Wpdm (see FIG. 20), and, simultaneously, such that the focal length of the imaging forming optical system 28 in the Y-axis direction and that in the Z-axis direction are different from each other. The focal length of the imaging forming optical system 28 in the Y-axis direction is denoted by frm, and that in the Z-axis direction is denoted by frs.

If a rotational-symmetric imaging forming optical system with fr=57 (mm) is used under a condition where Wrm=0.1 (degrees) and Wrs=1 (degree), Wpdm, Wpds, and Rpd are given as follows: Wpdm=0.099 (mm), Wpds=0.995 (mm), Rpd=10. However, if an imaging forming optical system with fr=57 (mm) and frs=30 (mm) is used, Wpdm, Wpds, and Rpd are given as follows: Wpdm=0.099 (mm), Wpds=0.524 (mm), Rpd=5.3.

Thus, use of an imaging forming optical system where the focal length in the Y-axis direction differs from the focal length in the Z-axis direction makes the shape of the light-receiving region closer to a square than that with use of a rotational-symmetric imaging forming optical system.

Reducing the size of the light-receiving region is discussed below. If a rotational-symmetric imaging forming optical system with fr=30 (mm) is used, Wpdm, Wpds, and Rpd are given as follows: Wpdm=0.052 (mm), Wpds=0.524 (mm), Rpd=10. However, a photodetector having a light-receiving region where Wpdm is 0.052 mm is difficult to manufacture and difficult to realize.

In the light of that a minimum manufacturable width of the light-receiving region is approximately 0.1 mm, when the rotational-symmetric imaging forming optical system is used, fr is approximately 57 mm or smaller is the limit, and regarding the light-receiving region, Wpdm is approximately 0.099 (mm) and Wpds is approximately 0.995 (mm) are the limit.

By contrast, if an imaging forming optical system in which the focal length in the Y-axis direction and that in the Z-axis direction are different from each other, and for example, frm=57 (mm) and frs=6 (mm) is used, Wpdm and Wpds are given as follows: Wpdm=0.099 (mm), Wpds=0.104 (mm). Accordingly, the area of the light-receiving region is reduced to approximately one-tenth of that of the configuration where the rotational-symmetric imaging forming optical system with fr=57 (mm) is used. This is favorable in terms of cost.

From the viewpoint of design and ease of manufacture of the imaging forming optical system, and reduction of the device in size, the value of Rpd is preferably 1 or greater.

Figure 21A:
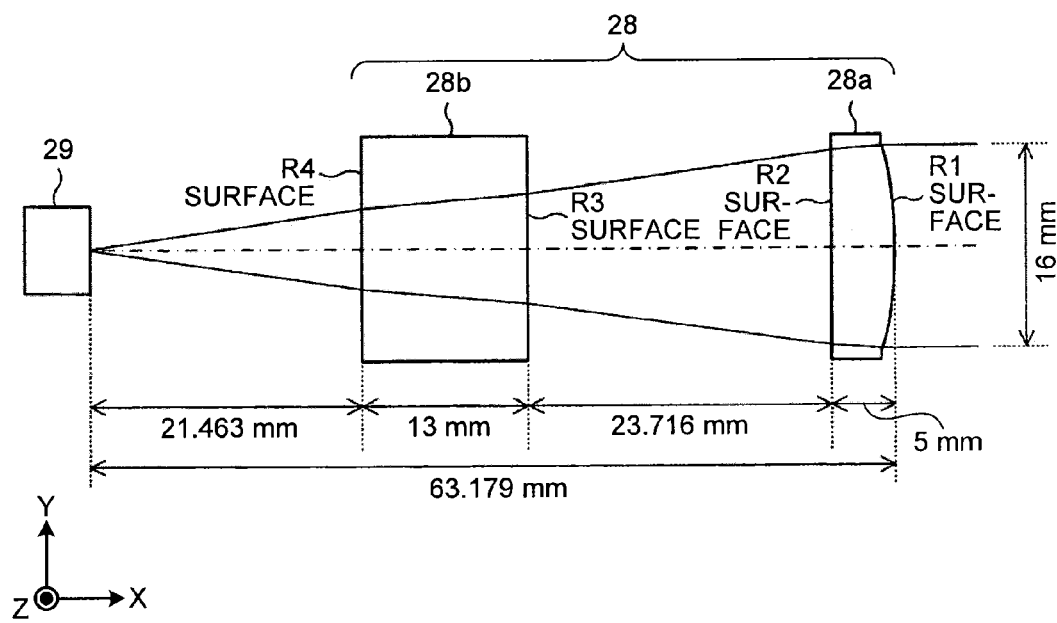
FIGS. 21A and 21B are diagrams for describing a first specific example of an imaging forming optical system 28.
Figure 21B:
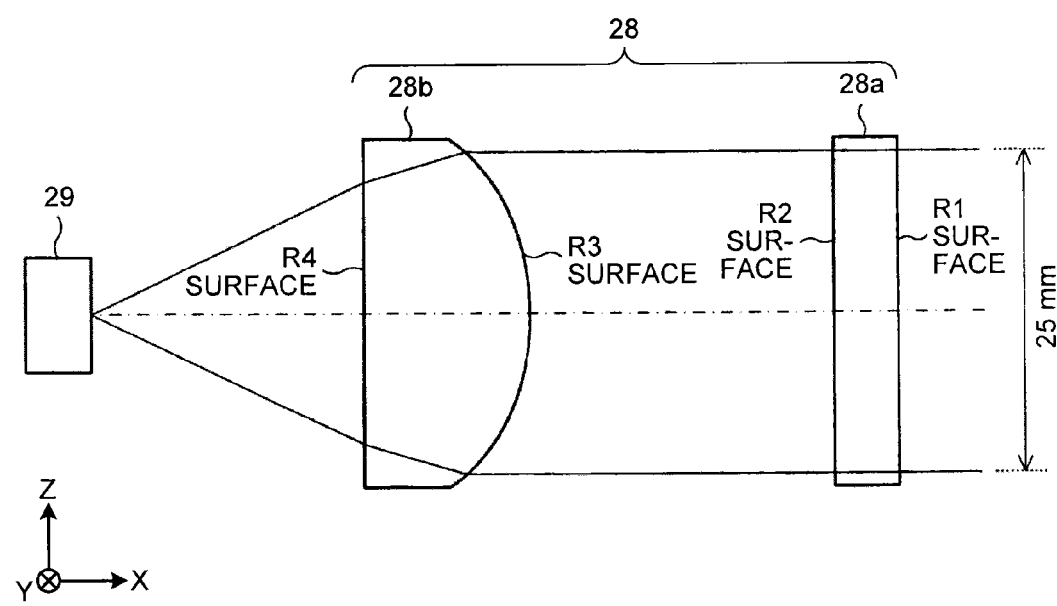

A first specific example of the imaging forming optical system 28 is described below. FIGS. 21A and 21B illustrate the imaging forming optical system 28 of the first specific example.

The imaging forming optical system 28 includes two cylindrical surfaces, and is configured such that the focal length in the Y-axis direction and that in the Z-axis direction are different from each other. The imaging forming optical system 28 is configured such that incident parallel light focuses on the photodetector 29 in both the Y-axis direction and the Z-axis direction. Each of the first imaging forming element 28a and the second imaging forming element 28b is rectangular in shape.

The R1 surface is a cylindrical surface that has an aspherical profile in the X-Y cross section but is flat in the X-Z cross section. The R2 surface is flat both in the X-Y cross section and the X-Z cross section. The R3 surface is a cylindrical surface that is flat in the X-Y cross section but has an aspherical profile in the X-Z cross section. The R4 surface is flat both in the X-Y cross section and the X-Z cross section.

Put another way, the R1 surface has a curvature only in the Y-axis direction and its aspherical surface is expressed by Equation (1) below. In Equation (1), C is the curvature, and is equal to 1/r, where r is the curvature radius. In Equation (1), j is an integer larger than one, $A_j$ is an aspheric coefficient, K is the conic constant. The R1 surface has a shape created by sweeping the profile in the Y-axis direction along the Z-axis direction.

$$X = \frac{CY^2}{1+\sqrt{1-(1+K)C^2Y^2}} + A_2Y^2 + A_3Y^3 + \ldots + A_jY^j + \ldots \quad (1)$$

The R3 surface has a curvature only in the Z-axis direction and its aspherical surface is given by Equation (2) below. The R3 surface has a shape created by sweeping the profile in the Z-axis direction along the Y-axis direction.

$$X = \frac{CZ^2}{1+\sqrt{1-(1+K)C^2Z^2}} + A_2Z^2 + A_3Z^3 + \ldots + A_jZ^j + \ldots \quad (2)$$

Specific numerical examples are given in FIG. 22. The wavelength of light emitted from the light source 21 is 905 nm (nanometers). The first imaging forming element 28a and the second imaging forming element 28b made from "E48R" manufactured by ZEON CORPORATION are used.

In the imaging forming optical system 28, frm is 57.0 mm and frs is 30.0 mm. The size of the light receivable by the imaging forming optical system 28 is up to 16 mm in the Y-axis direction and up to 25 mm in the Z-axis direction. The F-number of the imaging forming optical system 28 in the Y-axis direction is 3.6 and that in the Z-axis direction is 1.2.

In this case, the light-receiving region can be caused to have a shape close to a square and, simultaneously, the area of the light-receiving region can be reduced. Furthermore, intensity of light received by the photodetector 29 can be increased.

Figure 23A:
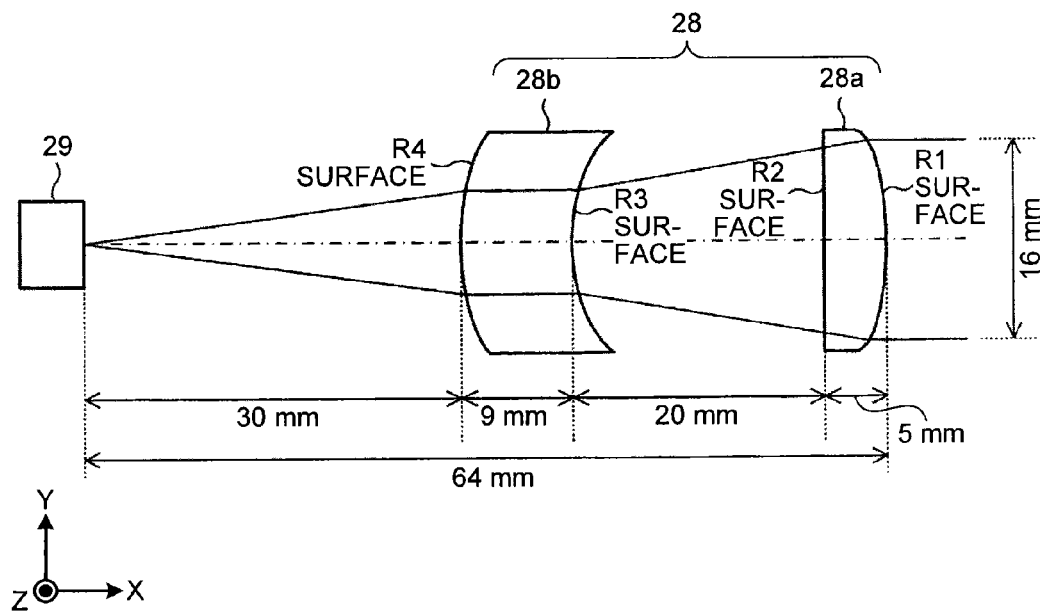
FIGS. 23A and 23B are diagrams for describing a second specific example of the imaging forming optical system 28.
Figure 23B:
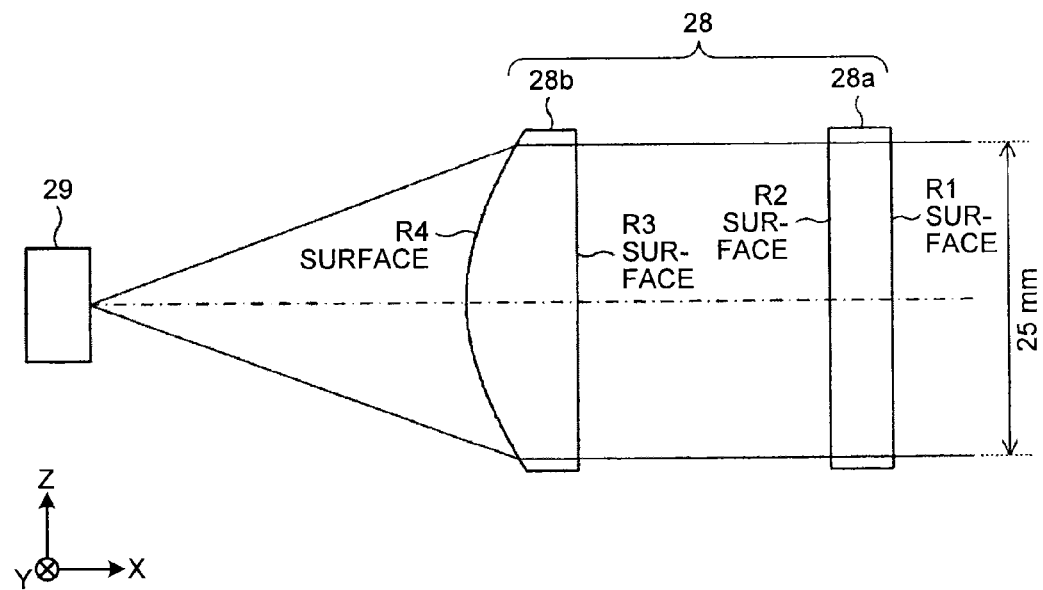

A second specific example of the imaging forming optical system 28 is described below. FIGS. 23A and 23B illustrate the imaging forming optical system 28 of the second specific example.

The imaging forming optical system 28 includes two cylindrical surfaces, and is configured such that the focal length in the Y-axis direction and that in the Z-axis direction are different from each other. Further, the imaging forming optical system 28 is configured such that incident parallel light focuses on the photodetector 29 in both the Y-axis direction and the Z-axis direction. Furthermore, the imaging forming optical system 28 has a rotation-symmetric aspherical surface. Each of the first imaging forming element 28a and the second imaging forming element 28b is rectangular in shape.

The R1 surface is a cylindrical surface that has an aspherical profile in the X-Y cross section but is flat in the X-Z cross section. The R2 surface is flat both in the X-Y cross section and the X-Z cross section. The R1 surface is a cylindrical surface that has a spherical profile in the X-Y cross section but is flat in the X-Z cross section. The R4 surface is a rotation-symmetric aspherical surface.

In short, the imaging forming optical system 28 has the two cylindrical surfaces each having a curvature only in the Y-axis direction and the one rotation-symmetric surface. In this case, the two cylindrical surfaces make up an afocal system in the Y-axis direction and compress light in the Y-axis direction. After exiting the two cylindrical surfaces, the light is converged by the rotation-symmetric surface.

Specific numerical examples are given in FIG. 24. The wavelength of light emitted from the light source 21 is 905 nm. The first imaging forming element 28a and the second imaging forming element 28b made from "E48R" manufactured by ZEON CORPORATION are used.

In the imaging forming optical system 28, frm is 57.0 mm and frs is 30.0 mm. The size of the light receivable by the imaging forming optical system 2 is up to 16 mm in the Y-axis direction and up to 25 mm in the Z-axis direction. The F-number of the imaging forming optical system 28 in the Y-axis direction is 3.6 and that in the Z-axis direction is 1.2.

In this case, the light-receiving region can be caused to have a shape close to a square and, simultaneously, the area of the light-receiving region can be reduced. In addition, intensity of light received by the photodetector 29 can be increased.

Figure 25:
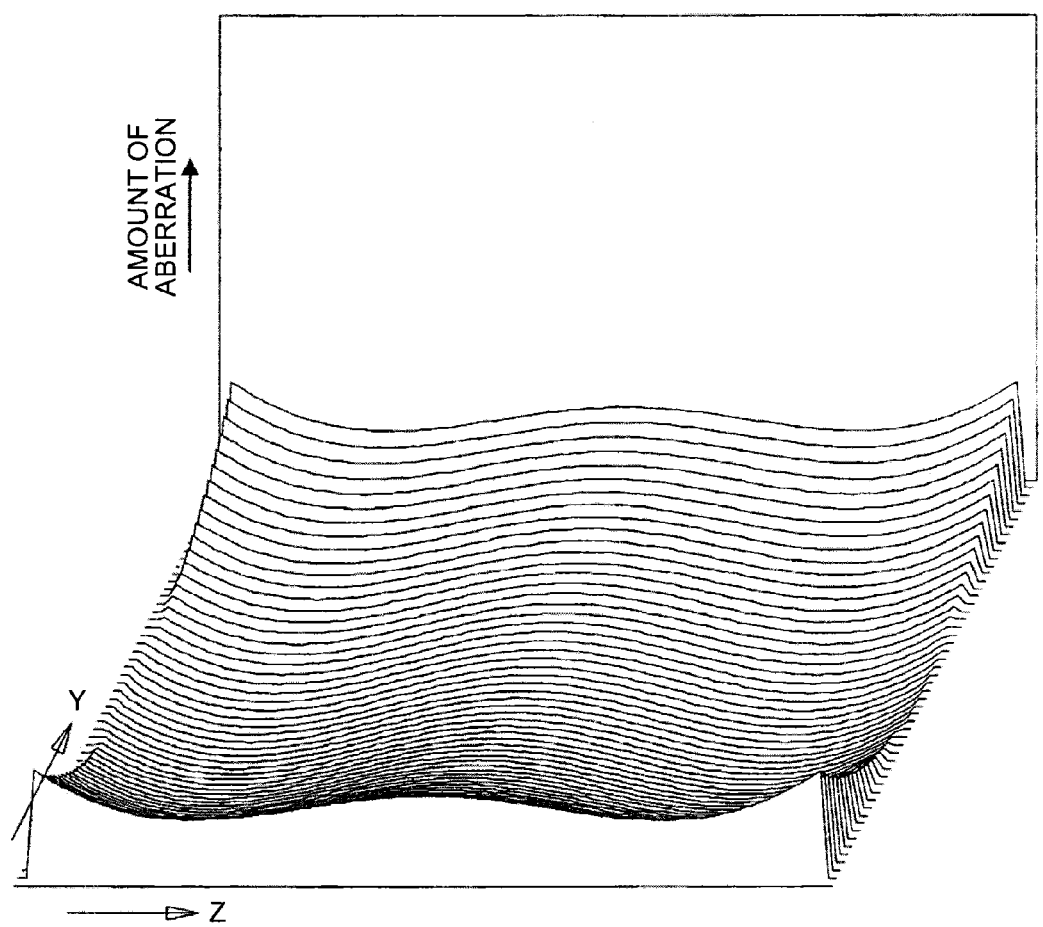
FIG. 25 is a diagram for describing wave aberration of the imaging forming optical system 28 of the second specific example.
Figure 26:
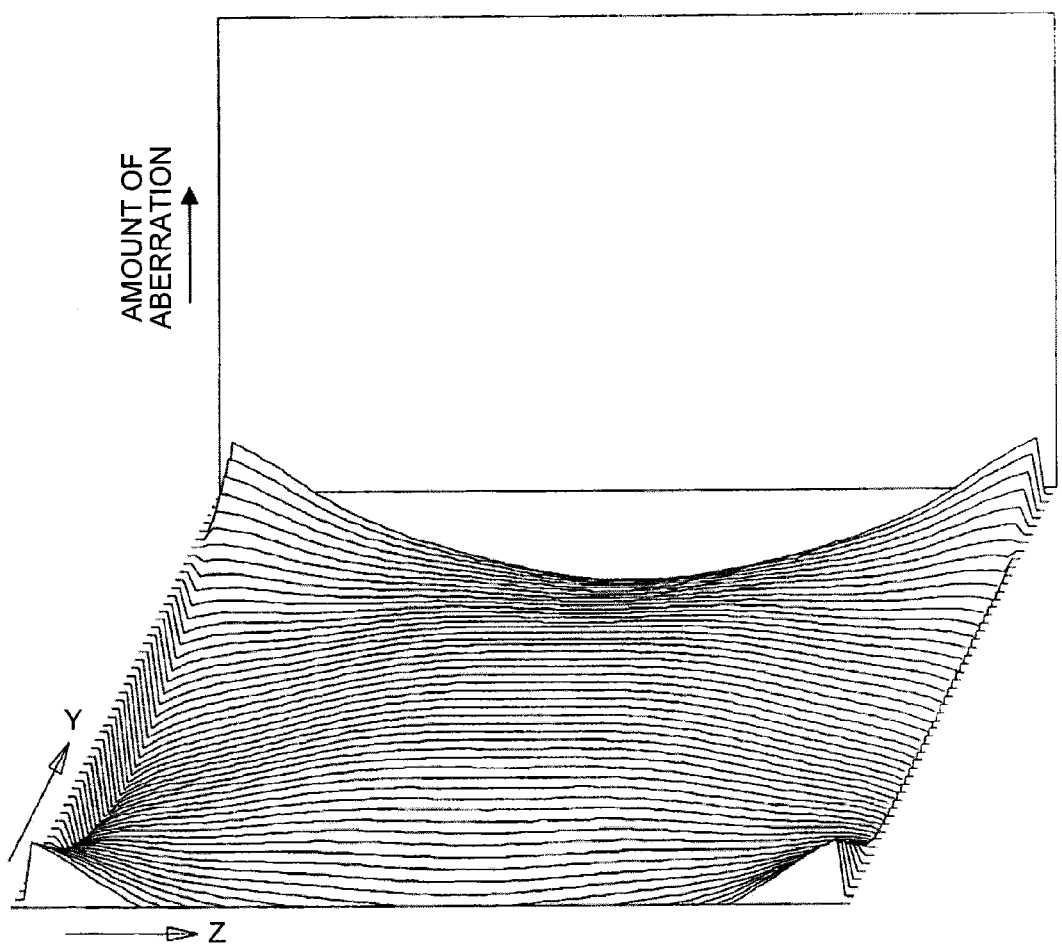
FIG. 26 is a diagram for describing wave aberration of the imaging forming optical system 28 of the first specific example.

FIG. 25 illustrates wave aberration of the imaging forming optical system 28 of the second specific example. PV (peak-to-valley) value of this wave aberration is $0.3\lambda$, where $\lambda$ is the wavelength of the light. FIG. 26 illustrates wave aberration of the imaging forming optical system 28 of the first specific example. PV value of this wave aberration is $29\lambda$. Thus, the wave aberration of the imaging forming optical system 28 of the second specific example is considerably smaller.

Generally, although a circular optical system produces low wave aberration, intensity of light received through the circular optical system is low. In contrast, although the intensity of light received via a rectangular optical system is high, the rectangular optical system produces large wave aberration. To take these into account, the imaging forming optical system 28 of the second specific example secures intensity of received light by employing the imaging forming elements each rectangular in shape, and reduces the wave aberration by employing the two cylindrical surfaces having curvatures in the same direction and the one rotation-symmetric surface. As a result, efficiency for light utilization can be increased.

The relative position of the two cylindrical surfaces and the one rotation-symmetric surface is arbitrary. However, positioning the rotation-symmetric surface closer to the photodetector 29 than the two cylindrical surfaces are minimizes wave aberration.

The imaging forming optical system 28 of the second specific example provides the effect of reducing wave aberration irrespective of the F-number. However, the imaging forming optical system 28 reduces the wave aberration considerably under a condition where a smaller one of the F-number in the Y-axis direction and the F-number in the Z-axis direction is smaller than two.

It is preferable that the two cylindrical surfaces are arranged on the different imaging forming elements as in the first and second specific examples. In this case, the difference between the focal length in the Y-axis direction and the focal length in the Z-axis direction can be increased, and thereby the shape of the light-receiving region can be made close to a square.

Figure 27:
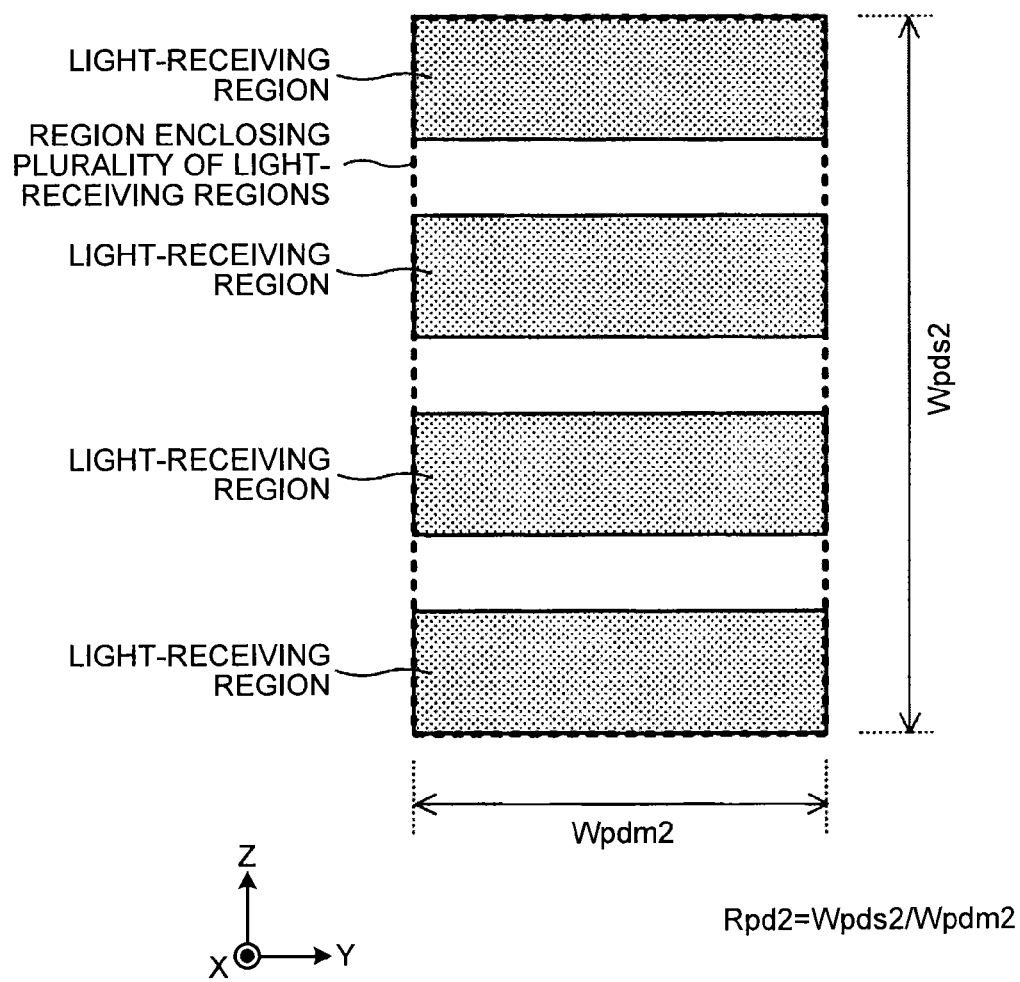
FIG. 27 is a first diagram for describing a case where the photodetector 29 includes a plurality of light-receiving regions.

The photodetector 29 may include a plurality of light-receiving regions arranged along the Z-axis direction as illustrated in FIG. 27 as an example. Here, the length of a region enclosing the plurality of light-receiving regions, in the Z-axis direction is denoted by Wpds2, the length of the region in the Y-axis direction is denoted by Wpdm2, and the denotation Rpd2=Wpds2/Wpdm2 is used.

FIG. 28 illustrates relationship between irradiated area and a plurality of light-receivable areas of the photodetector 29 including a plurality of the light-receiving regions. Here, the length of a region enclosing the plurality of light-receivable areas, in the Z-axis direction is denoted by Wrs2, the length of the region in the Y-axis direction is denoted by Wrm2, and the denotation Rr2=Wrs2/Wrm2 is used.

In this case, the description given earlier can be applied by replacing Wpdm, Wpds, Wrm, and Wrs with Wpdm2, Wpds2, Wrm2, and Wrs2, respectively.

By making the shape of the region enclosing the plurality of light-receiving regions of the photodetector 29 illustrated in FIG. 28 close to a square, occurrence of failure and reduction in manufacturing yield of the photodetector 29 can be reduced. Furthermore, variation in sensitivity among the plurality of light-receiving regions can be reduced.

As is apparent from the foregoing description, the object-information obtaining unit 203 according to the embodiment is an example of a processing unit of an object detection device according to an aspect of the present invention.

As described above, the laser radar 20 according to the embodiment includes the light emission system 201, the reflecting mirror 205, the light deflector 204, the light detection system 202, and the object-information obtaining unit 203.

The light emission system 201 includes the light source 21 and the coupling lens 22. The light detection system 202 includes the imaging forming optical system 28 and the photodetector 29.

Light emitted from the light source 21 is emitted to an object so as to irradiate an area having a shape that is longer in the Z-axis direction than in the Y-axis direction. The focal length of the imaging forming optical system 28 in the Y-axis direction and that in the Z-axis direction are different from each other. Furthermore, the light-receiving region is configured such that Rpd=Wpds/Wpdm is smaller than Re=Wes/Wem, where Wpds is the length of the light-receiving region in the Z-axis direction, Wpdm is the length of the light-receiving region in the Y-axis direction, Wes is the length of the light irradiating the object in the Z-axis direction, and Wem is the length of the light irradiating the object in the Y-axis direction.

This can increase object detection resolution in the Y-axis direction, widen the object-detectable area in the Z-axis direction, reduce failure of the photodetector 29 and reduce cost for the photodetector 29.

The imaging forming optical system 28 is configured such that a focal position of incident parallel light in the Y-axis direction substantially coincides with that in the Z-axis direction. This can increase intensity of light received by the photodetector 29. As a result, not only object detection accuracy can be increased but also object detectable distance can be increased.

The first imaging forming element 28a and the second imaging forming element 28b are rectangular in shape. This can reduce decrease in intensity of light received by the photodetector 29.

Furthermore, making up the imaging forming optical system 28 from the two imaging forming elements can reduce cost while reducing increase in size.

The imaging forming optical system 28 of the second specific example has the two cylindrical surfaces having curvatures only in the Y-axis direction and the one rotation-symmetric surface. The one rotation-symmetric surface is positioned closer to the photodetector 29 than the two cylindrical surfaces are. This leads to reduction in wave aberration of the imaging forming optical system 28.

Furthermore, the light-emitting region is configured such that Rld=Wlds/Wldm is smaller than Re=Wes/Wem, where Wlds is the length of the light-emitting region in the Z-axis direction, Wldm is the length of the light-emitting region in the Y-axis direction, Wes is the length of the light irradiating the object in the Z-axis direction, and Wem is the length of the light irradiating the object in the Y-axis direction. This facilitates manufacture of the light source 21, and can reduce decrease in intensity of light emitted from the light source 21.

The object-information obtaining unit 203 obtains object information including the distance to the object based on information about when the light source 21 is switched on and when the photodetector 29 has received light. Accordingly, the object information can be obtained with high accuracy.

Because the monitoring apparatus 10 according to the embodiment includes the laser radar 20, the monitoring apparatus 10 can obtain object information and motion information with high accuracy without increase in cost.

Although lenses are used as the imaging forming elements in the embodiment described above, the imaging forming elements are not limited thereto; a reflector element may alternatively be used as the imaging forming element. For example, a cylindrical mirror having a curvature only in the Y-axis direction can be used as the first imaging forming element 28a.

In the embodiment described above, the light deflector 204 may include, in lieu of the rotary mirror described above, a pivoting mirror.

In the embodiment described above, the light deflector 204 may include, in lieu of the rotary mirror described above, a rotating polygon mirror.

In the embodiment described above, the light emission system 201 is located in the positive Z direction from the light detection system 202; however, location of the light emission system 201 is not limited thereto.

In the embodiment described above, a vertical-cavity surface-emitting laser (VCSEL) may be used as a light-emitting element of the light source 21. Alternatively, an edge-emitting laser (LD (laser diode)) may be used as the light-emitting element.

In the embodiment described above, a part of processing performed by the object-information obtaining unit 203 may be performed by the monitoring control device 40. A part of processing performed by the monitoring control device 40 may be performed by the object-information obtaining unit 203.

In the embodiment described above, the number of the laser radars 20 included in the monitoring apparatus 10 is one; however, the number is not limited to one. The monitoring apparatus 10 may include a plurality of the laser radars 20 depending on the size of the vehicle, a monitored area, and/or the like.

In the embodiment described above, the monitoring apparatus 10 uses the laser radar 20 in monitoring the area forward of the vehicle; however, the area to be monitored by the laser radar 20 is not limited thereto. For example, the laser radar 20 may alternatively be used in an apparatus that monitors an area in the rear or at a side(s) of a vehicle.

Further, the laser radar 20 may be used in a sensing apparatus other than those for vehicle onboard use. When the laser radar 20 is used in such a sensing apparatus, the monitoring control device 40 may preferably issue alarm information appropriate for the purpose of sensing.

The laser radar 20 may be used only for detecting presence/absence of an object.

The laser radar 20 may be used in other apparatuses than sensing apparatuses. Examples of the other apparatuses include distance measurement apparatuses and shape measurement apparatuses.

According to an embodiment of the present invention, an object detection device with reduced cost can be provided.

Although the invention has been described with respect to specific embodiments for a complete and clear disclosure, the appended claims are not to be thus limited but are to be construed as embodying all modifications and alternative constructions that may occur to one skilled in the art that fairly fall within the basic teaching herein set forth.

What is claimed is:

1. An object detection device comprising:
   a light source;
   a light deflector that scans a scanning area with light emitted from the light source;
   an imaging forming optical system; and
   a light-receiving unit that, when an object is present in the scanning area, receives reflected light from the object through the imaging forming optical system, wherein
   the light emitted from the light source is emitted to the object so as to irradiate an area having a shape longer in a second direction orthogonal to a first direction than in the first direction, a focal length of the imaging forming optical system in the first direction and that in the second direction are different from each other, and Wpds/Wpdm<Wes/Wem is satisfied, where Wpdm is a length of the light-receiving region of the light-receiving unit in the first direction, Wpds is a length of the light-receiving region of the light-receiving unit in the second direction, Wem is a length of the area irradiated with the light emitted to the object, in the first direction, and Wes is a length of the area irradiated with the light emitted to the object, in the second direction.

2. The object detection device according to claim 1, wherein, in the imaging forming optical system, a focal position of parallel light in the first direction coincides with that in the second direction.

3. The object detection device according to claim 1, wherein the imaging forming optical system includes at least two cylindrical surfaces having curvatures in a same direction and at least one rotation-symmetric surface.

4. The object detection device according to claim 3, wherein the at least one rotation-symmetric surface is positioned closer to the light-receiving unit than the at least two cylindrical surfaces are.

5. The object detection device according to claim 1, wherein the imaging forming optical system is rectangular in shape.

6. The object detection device according to claim 1, wherein Wpds/Wpdm<Wlds/Wldm is satisfied, where Wldm is a length of a light-emitting region in the first direction and Wlds is a length of the light-emitting region in the second direction.

7. The object detection device according to claim 1, further comprising a coupling lens arranged on an optical path of the light emitted from the light source, wherein light emitted from one point of the light source becomes divergent light by the coupling lens.

8. The object detection device according to claim 1, wherein the light-receiving unit includes a plurality of light-receiving regions, and Wpds2/Wpdm2<Wes/Wem is satisfied, where Wpdm2 is a length of a region enclosing the plurality of light-receiving regions, in the first direction and Wpds2 is a length of the region enclosing the plurality of light-receiving regions, in the second direction.

9. The object detection device according to claim 1, wherein the first direction is parallel to a direction in which the light is scanned by the light deflector.

10. A sensing apparatus comprising:
the object detection device according to claim 1; and
a monitoring control device that determines whether or not an object is present and motion information including at least any one of a moving direction of the object and a moving velocity of the object based on an output of the object detection device.

11. The sensing apparatus according to claim 10, wherein the sensing apparatus is mounted on a vehicle, and
the monitoring control device determines whether or not danger is present based on at least any one of information about a position of the object and the motion information.

12. The object detection device according to claim 1, wherein a peak-to-valley wave aberration of the imaging forming optical system is $0.3\lambda$, $\lambda$ being a wavelength of the emitted light.

* * * * *